(12) United States Patent
Tomida et al.

(10) Patent No.: US 6,379,001 B1
(45) Date of Patent: Apr. 30, 2002

(54) IMAGE DISPLAY APPARATUS, AND INK AND IMAGE ERASING METHOD FOR USE IN THE APPARATUS

(75) Inventors: Yoshinori Tomida, Atsugi; Satoshi Yoshihara, Kawasaki; Yoshio Hotta, Hadano, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/510,335

(22) Filed: Feb. 22, 2000

(30) Foreign Application Priority Data

| Feb. 26, 1999 | (JP) | ........................................... 11-050468 |
| Oct. 8, 1999 | (JP) | ........................................... 11-288817 |
| Dec. 13, 1999 | (JP) | ........................................... 11-352857 |

(51) Int. Cl.$^7$ .............................. B41J 2/01; B43L 1/00
(52) U.S. Cl. ...................... 347/100; 347/105; 106/32.5; 15/256.51; 434/411
(58) Field of Search ........................... 347/95, 96, 100, 347/101, 105, 106; 106/31.56, 31.58, 31.27, 32.5; 15/256.5, 256.51, 256.52; 434/411, 412, 417

(56) References Cited

U.S. PATENT DOCUMENTS

| 4,313,124 A | | 1/1982 | Hara ............................ 347/57 |
| 4,345,262 A | | 8/1982 | Shirato et al. ................. 347/10 |
| 4,459,600 A | | 7/1984 | Sato et al. ..................... 347/47 |
| 4,463,359 A | | 7/1984 | Ayata et al. ................... 347/56 |
| 4,558,333 A | | 12/1985 | Sugitani et al. ............... 347/65 |
| 4,720,707 A | * | 1/1988 | Konishi et al. ................ 347/57 |
| 4,723,129 A | | 2/1988 | Endo et al. .................... 347/56 |
| 4,723,138 A | * | 2/1988 | Hashimoto et al. .......... 347/140 |
| 4,740,796 A | | 4/1988 | Endo et al. .................... 347/56 |
| 5,442,374 A | * | 8/1995 | Koizumi ...................... 345/110 |
| 5,677,363 A | * | 10/1997 | Imagawa ..................... 523/161 |
| 5,943,067 A | * | 8/1999 | Kong ............................ 347/2 |
| 5,957,700 A | * | 9/1999 | Ariyama ..................... 434/417 |

FOREIGN PATENT DOCUMENTS

| EP | 0 372 467 | | 6/1990 |
| EP | 556 668 A1 | * | 8/1993 |

(List continued on next page.)

*Primary Examiner*—John Barlow
*Assistant Examiner*—Blaise Mouttet
(74) *Attorney, Agent, or Firm*—Fitzpatrick, Cella, Harper & Scinto

(57) ABSTRACT

There is provided an image display apparatus and an image erasing method, by which a color image made of an ink can be displayed by fixing the ink on the recording medium, and, when it is desired to erase the color image, the color image on the recording medium can be erased by image erasing means. Therefore, the present invention comprises ink application means 1 for applying an ink onto recording medium 10 in accordance with image data, and image erasing means 4 for erasing the image formed on recording medium 10 by ink application means 1, wherein, when the solubility parameter (SP value) of the substance remaining on recording medium 10 after applying the ink is taken as $SP_p$, the SP value of the substance constituting the surface of the recording medium is taken as $SP_m$, and the SP value of the substance constituting the surface of the image erasing means is taken as $SP_c$, said $SP_p$, $SP_m$ and $SP_c$ satisfy the relationship $|SP_p - SP_m| > |SP_p - SP_c|$.

35 Claims, 10 Drawing Sheets

FOREIGN PATENT DOCUMENTS

| | | | |
|---|---|---|---|
| EP | 0 571 190 | | 11/1993 |
| EP | 0 812 888 | | 12/1997 |
| EP | 0 826 752 | | 3/1998 |
| GB | 2141 669 | * | 5/1984 |
| GB | 2 206 842 | | 1/1989 |
| JP | 59-123670 | | 7/1984 |
| JP | 59-138461 | | 8/1984 |
| JP | 61-009071 | | 1/1986 |
| JP | 5-000597 | | 1/1993 |
| JP | 5-014564 | | 1/1993 |
| JP | 05-58091 | | 3/1993 |
| JP | 5-160940 | | 6/1993 |
| JP | 5-162494 | | 6/1993 |
| JP | 6-032095 | | 2/1994 |
| JP | 6-048091 | | 2/1994 |
| JP | 6-087295 | | 3/1994 |
| JP | 6-245008 | | 9/1994 |
| JP | 8-106261 | | 4/1996 |
| JP | 10-142052 | | 5/1998 |
| WO | WO 83/01625 | * | 5/1983 |

* cited by examiner

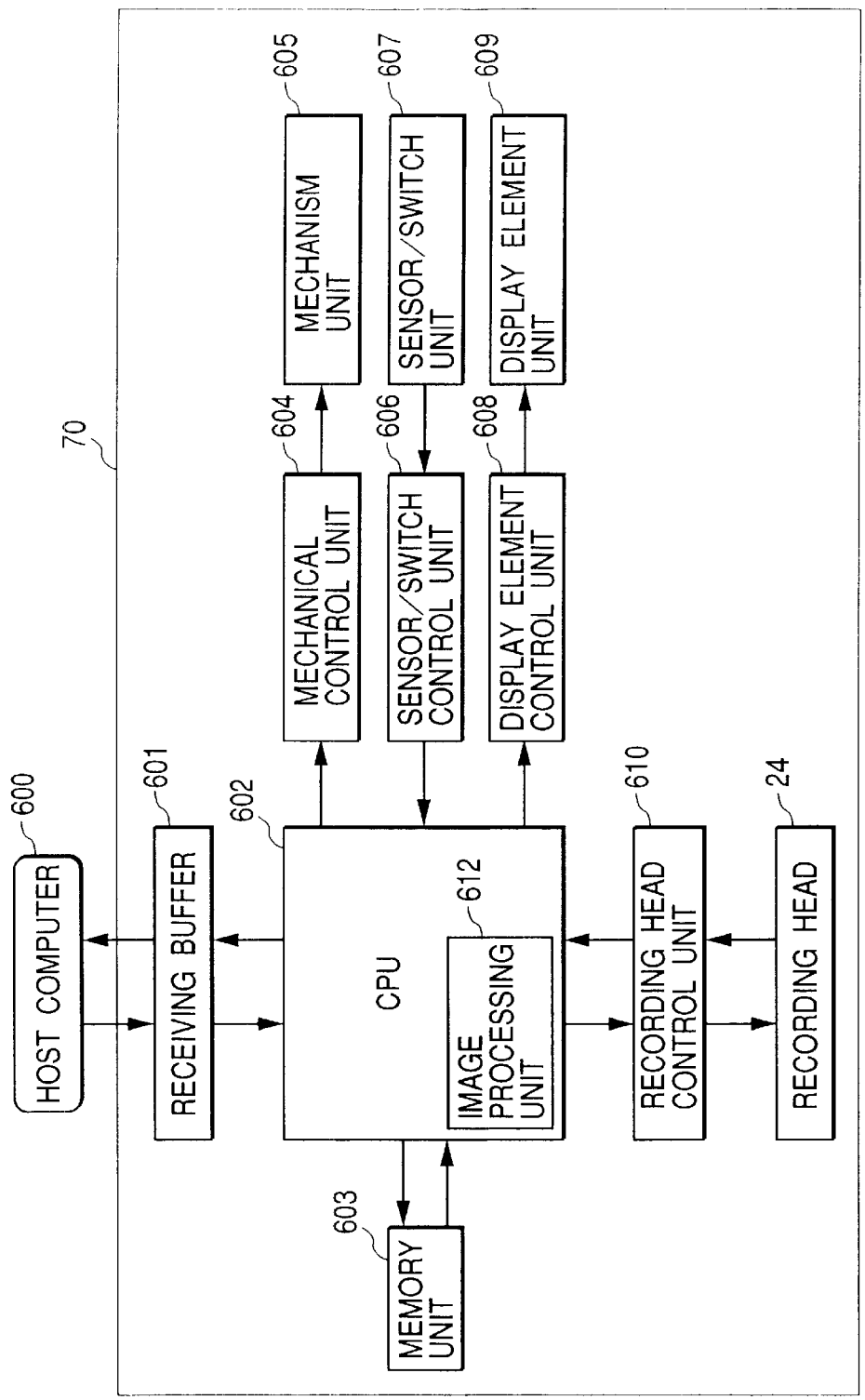

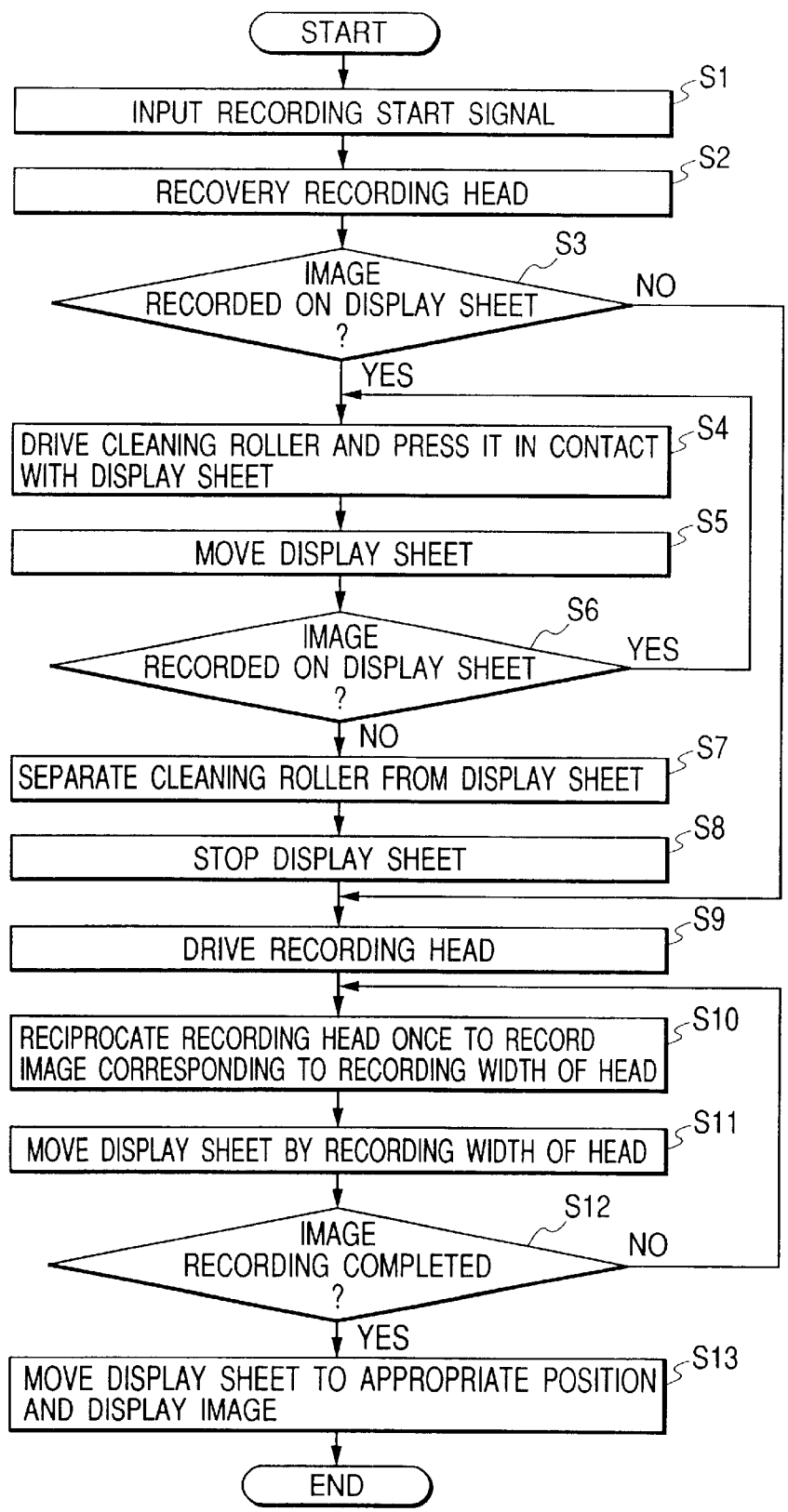

MOVING DIRECTION OF DISPLAY SHEET ←

DISPLAY SURFACE 10 (FRONT)

SCANNING DIRECTION 24
1
25

CONNECTED WITH CARRIAGE 25b
25c
25e
25d
11
4
10 (BACK)
24
24e
24b
24d
24c
12
DIRECTION
10 (FRONT)

IMAGE DISPLAY APPARATUS, AND INK AND IMAGE ERASING METHOD FOR USE IN THE APPARATUS

BACKGROUND OF THE INVENTION

1. Field of the Invention

The present invention relates to an image display apparatus and an image erasing method, in which a color image made of an ink can be displayed on a recording medium by fixing the ink on the recording medium, and, when it is desired to erase the color image, the color image on the recording medium can be erased by image erasing means.

2. Related Background Art

In recent years, as global environment problems, attention is attracted to the reduction of the waste and the resource usage, and important task is to reduce the waste of recording media, such as papers, plastic films for overhead projector (OHP) and the like, as well as the usage of the materials for the recording media, such as wood resources, petroleum and the like. As a part of measures to the reduction of the resource usage, the reuse of the papers and the like as waste papers, which are used once, without disposal of them is progressing. However, the plastic films for OHP and the like are almost not recovered, and further, there are many problems about the recovery and reuse of these films. Specifically, for example, with respect to the recovery, there are problems about the labor for the dividing operation in accordance with the types of the recording media and the operation cost required for the recovery, as well as the collection place and the control for the recovered materials. With respect to the reuse, there are problems about the quality of the reproduced products and the cost required for the deinking treatment of the ink and the like.

An information board or an electronic blackboard is an image display device which has solved the above-mentioned problems. Specifically, this image display device is a device in which the image recorded once on the recording medium can be erased, an image can be recorded on the recording medium repeatedly, and the image recorded can be erased repeatedly. Such an image display device is one which is effective for the resource-saving because a recording medium is not consumed uselessly, and utilized for various purposes.

In general, an information board or an electronic blackboard is an image display device for displaying a static image on a large display. The information board is an image display device for displaying the image formed by an input device, such as a computer or the like, on a recording medium, mainly for the purpose of advertisement, propaganda, notice and the like. For example, this is a device which functions as a guide plate, in station precincts, for displaying information, such as the destination of a train, the operation state and the like; functions as a program table, at the entrance of a meeting room and in a wedding hall, for displaying the program; and functions as a notice plate, in a university, for displaying information, such as cancellation of lectures, changing of a lecture room and the like. Further, the electronic blackboard is a device used in a conference, a meeting or the like, in which an image, such as a character, a figure or the like, written on a recording medium (hereinafter, referred to also as display sheet) is read by a scanner and copied, and then, the image can be erased by means of a blackboard eraser.

Herein, the above-mentioned information board and electronic blackboard are explained in detail.

First, with respect to the information board, in the conventional information board in which a static image is recorded and displayed on the recording medium and erased as mentioned above, a toner image is formed by allowing a conductive magnetic toner to electrostatically adsorb onto an endless sheet (recording medium) in a belt form utilizing a magnestylus technique. The toner image is displayed by moving the sheet, and, after the display, the toner image is erased by removing the static electricity between the toner and the sheet.

FIG. 11 is a cross-sectional view of the conventional information board. In addition, FIG. 12 is a partially sectional view of the recording medium used in the conventional information board. Using FIG. 11 and FIG. 12, the conventional information board is explained.

In FIG. 11, 801 designates a recording electrode, 802 designates a conductive magnetic toner, and 803 designates a recording medium. Recording medium 803, as shown in FIG. 12, comprises surface dielectric layer 901$a$, resistance layer 901$b$, conductive layer 901$c$, and supporting layer 901$d$.

Further, in FIG. 11, 804 designates an image formation unit, 805 designates a circuit substrate, 806 designates a cleaning brush, 807 designates a rotation magnet, 808 designates a non-magnetic cylinder, 809 designates a movement roller for moving the recording medium, 810 designates a display window, and 811 designates a body frame.

Thus, in this information board, by rotating the above-mentioned rotation magnet 807, conductive magnetic toner 802 as a colorant substance is conveyed on the above-mentioned non-magnetic cylinder 808, so that this is supplied on recording electrode 801 composed of a magnetic substance. Then, a voltage corresponding to the image signal generated by circuit substrate 805 is applied between conductive layer 901$c$ of recording medium 803 and recording electrode 801, and by the electric charge ($10^{-8}$ to $10^{-7}$ c) induced in toner 802, the above toner 802 is allowed to electrostatically adhere to recording medium 803 (1,000 to 10,000 pF/cm$^2$), to thereby form an image. It is noted that the image formed once is returned to the original position by rotating recording medium 803 in the form of an endless belt by one cycle, and toner 802 is scraped down from recording medium 803 by cleaning brush 806 and recovered on the above-mentioned recording electrode 801 which is set immediately below brush 806, so that recording medium 803 is reused.

Such an information board can perform the image writing and erasing in accordance with the image information transmitted from an external image input device, such as a computer or the like. Further, by connecting the external image input device with each information board through a network, it becomes possible to display the image information transmitted from the external image input device on each information board in a distant place simultaneously, and the information board can be effectively utilized as a display device for the notice plate, advertisement plate and the like.

Next, an electronic blackboard is explained. FIGS. 13A to 13C are diagrammatic views showing the construction of the conventional electronic blackboard, and FIG. 13A is a top view, FIG. 13B is a front view, and FIG. 13C is a side view.

As shown in those drawings, in this electronic blackboard, within leg-fitted box type frame 1001 having, at the front, opening 1001$a$ in a rectangular form, recording medium (display sheet) 1002 to be a display surface is arranged in a state such that it is built over right and left rollers 1003, 1004. On the surface of this display sheet 1002, using a pen containing an exclusive ink, not only can an optional image, such as a character, a figure or the like, be written in handwriting, but also the image can be erased by a blackboard eraser, and further, the writing and the erasing can be repeated endlessly. Further, this display sheet 1002 is endlessly scanned by rotating one roller 103 using the driving device, which is not shown.

In addition, at the rear of one roller 1003 in the above-mentioned box type frame 1001, there is arranged display surface image reading scanner 1005 which covers the entire of the width of display sheet 1002 (length in the direction perpendicular to the moving direction) and is capable of reading the image on display sheet 1002.

Further, at the lower portion of the above-mentioned box type frame 1001, there is arranged printer 1006 which performs the printing of the image on display sheet 1002 read by the above-mentioned display surface image reading scanner 1005 on a paper surface.

When the printing is performed by this printer 1006, the image on display sheet 1002 is read by display surface image reading scanner 1005 by moving display sheet 1002. Thus, display surface image reading scanner 1005 successively reads the image according to the movement of display sheet 1002 and transmits the image data in the form of an electric signal to printer 1006 successively. Then, printer 1006 performs the printing of the image on display sheet 1002 in accordance with the image data from display surface image reading scanner 1005 on a paper surface.

Thus, the above-mentioned electronic blackboard can be used similarly to the ordinary blackboard or white board in a way such that an image can be optionally written on display sheet 1002 exposed at opening 1001a of box type frame 1001 and the image can be erased. In addition, by display surface image reading scanner 1005 and printer 1006, the image on display sheet 1002 can be printed on a paper surface and recorded.

Further, such an electronic blackboard has not only advantages which the blackboard and white board have, in that the display surface is large, there is no need for darkening the room, visibleness is excellent, and an optional part of the image can be easily written, erased and corrected, but also remarkable advantages in that the image on the display surface can be recorded on a paper surface and stored.

As mentioned above, the information board and the electronic blackboard which display a static image can be effectively used by utilizing the respective advantages. Further, they are advantageous image display devices from the viewpoint of the reduction of the consumption of paper and electric power.

However, in the above-mentioned recording principle of the information board, the toner needs to have magnetic properties. Therefore, the coloring of the toners in colors other than black is difficult, and thus, there has been a problem in that a color image cannot be formed.

Further, the above-mentioned electronic blackboard is not a device in which the image information transmitted from an external image input device, such as a computer or the like, is automatically written on the display sheet using image recording means, such as an ink-jet recording method or the like, but a device in which an optional image, such as a character, a figure or the like, is written on the display sheet in handwriting, and thus, this not suitable as a display device for a notice plate, advertisement plate and the like. In addition, with respect to this electronic blackboard, there has not yet been a product in which the image written once is automatically erased. Conventionally, some proposals have been made with respect to the invention of the electronic blackboard having image erasing means, and such invention is disclosed in, for example, Japanese Patent Application Laid-Open Nos. 61-9071, 5-597, 5-14564, 5-160940, 5-162494, 632095, 6-48091, 6-87295 and 6-245008. In the above-mentioned prior art documents, there is disclosed an invention wherein an image, such as a character, a figure or the like, is written on a recording medium (display sheet) in handwriting using writing utensils for electronic blackboard, and the image on the recording medium is wiped and erased using a device similar to the electrophotography sensitizing material cleaning device used in a copying machine, such as a cleaning fur brush, a rubber blade or the like. However, the writing of the image according to above prior art documents is done only in handwriting using writing utensils in a conventional manner.

In contrast, in Japanese Patent Application Laid-Open No. 5-58091, image writing which is performed automatically is disclosed. In this Japanese Patent Application Laid-Open No. 5-58091, by discharging the same ink as that in the pen used in the handwriting, i.e., ink for use in the marker pen for white board, from an ink-jet head, an image is formed on the display sheet automatically. According to this, it seems that the writing of an image on the display sheet can be performed automatically; however, actually, it is difficult to excellently discharge the above-mentioned ink for use in the marker pen for a white board from the ink-jet head, and thus, it is considered that it is also difficult to surely form an image. The reason why it is difficult to excellently discharge the above-mentioned ink for use in the marker pen for a white board from the ink-jet head is presumably that the ink viscosity is high. In addition, the above-mentioned ink for use in the marker pen for a white board is not designed so that it is discharged from the ink-jet head. Therefore, this ink does not have a satisfactory moisture property, and thus, this ink is likely to be too dry. As a result, non-discharge of a nozzle is likely to occur. As apparent from the above, for surely forming an image on the display sheet, it is necessary to use an ink which can be excellently discharged from the ink-jet head.

In the above-mentioned display device for displaying a static image for the purpose of advertisement, propaganda, notice and the like, it is desired that the device has functions not only as a stand-alone device placed in a meeting room like an electronic blackboard, but also as a display device which can be connected with a network, and that it is possible to successively display the information from a distant place through the network, and in a plurality of places.

Further, it is desired that not only can the image writing and erasing in accordance with the image information from an external image display device, such as a computer or the like, be performed, but also a color image can be displayed, and additionally, it is possible to display high quality image.

Thus, the present inventors have made experiments and studies on the image display device, as a system capable of displaying a color image, which comprises a recording medium similar to the electronic blackboard, ink-jet recording means and image erasing means, wherein an ink is discharged from the ink-jet recording means on the recording medium to display the image on the recording medium, and then, the image on the recording medium can be erased by the image erasing means.

The ink-jet recording method is a method in which the recording is performed by forming ink drops and allowing the ink to adhere to a recording medium, such as a pager, an OHP film or the like. The ink for ink-jet recording used in the conventional ink-jet recording method generally contains water as a main component, a dye or pigment mixed as a colorant, and further a water-soluble high-boiling point solvent, such as a glycol, for the purpose of prevention of the drying and the nozzle clogging and the like.

When, using such an ink for ink-jet recording, the recording is performed on the recording medium similar to the conventional electronic blackboard by the ink-jet recording method, a problem arises in that an excellent image formation is difficult because the above-mentioned ink for ink-jet recording is repelled on the recording medium. Further, also in Japanese Patent Application Laid-Open Nos. 8-106261 and 8-310078, the recording on an electronic blackboard using an ordinary ink for ink-jet recording is disclosed; however, by the inventions disclosed in these prior art documents, the above-mentioned problems also cannot be solved.

Herein, the reason why the above-mentioned ink for ink-jet recording cannot be excellently fixed on the recording medium similar to the conventional electronic blackboard is briefly explained. In general, as a recording medium used in the electronic blackboard, a display sheet obtained by laminating a fluorine compound system film on an opalescence white base film is used. (Generally, such a display sheet has a hard permeability.) When an image is written on this display sheet using a pen for electronic blackboard (hereinafter, referred to also as marker for white board), a resin film containing a releasing agent and a pigment remains on the display sheet after the moisture among the ink components is evaporated. Thus, when the writing is performed using a pen for electronic blackboard, the ink can be excellently fixed on the display sheet. Further, this resin film can be easily released from the display sheet, and thus, wiped and erased by a cloth, a felt, a sponge or the like. This is because the surface tension of the recording medium surface (display sheet surface) is set to be low so that the image on the display sheet is easily erased. On the other hand, when an attempt is made to fix an ink for ink-jet recording on the display sheet, an excellent image formation cannot be achieved due to the flowing of the ink. This is because, generally, the ink for ink-jet recording permeates into a recording medium (ink receiving layer), so that the ink is fixed on the recording medium. That is, the ink for ink-jet recording is designed so as to permeate into the recording medium. Therefore, when an attempt is made to fix the ink for ink-jet recording on the above-mentioned display sheet having a hard permeability, the ink cannot permeate into the display sheet because there is no ink receiving layer in the display sheet, and thus, the ink flows on the display sheet. For forming an image on the recording medium having a hard permeability, it is necessary that the ink be not the conventional ink which permeates into the recording medium but an ink which is fixed on the recording medium surface. It should be noted that when the retention property (fixing property) of the ink is enhanced to too high extent, in turn, the ink cannot be released from the recording medium. Therefore, the balance between the fixing property and the releasing property of the ink relative to the recording medium is important. Taking the above into consideration, an ink which can be fixed on a recording medium having a hard permeability, released from the recording medium after the fixing on the recording medium once, and discharged from ink-jet recording means is desired.

For the above-mentioned image display device in which an image can be recorded on the recording medium repeatedly and the image can be erased repeatedly, it is desired that not only can the ink forming the image be easily released from the recording medium, but also the ink is strongly fixed on the recording medium. That is, it is necessary to simultaneously satisfy the antithetical properties, i.e., the fixing property and the releasing property of the image.

SUMMARY OF THE INVENTION

In view of the above-mentioned problems, the present invention has been made, and an object of the present invention is to provide an image display apparatus and an image erasing method, by which the recording and the erasing of the image in accordance with the image information from an external image display apparatus, such as a computer or the like, can be performed.

Further, it is an object of the present invention to provide an image display apparatus and an image erasing method, by which a color image can be displayed by fixing an ink on a recording medium using ink application means, and, when it is desired to erase the color image, the color image on the recording medium can be erased by image erasing means, and additionally, it is possible to display a high quality image.

It is an object of the present invention to provide an image display apparatus and an image erasing method, in which the apparatus has functions not only as a stand-alone apparatus placed in a meeting room and the like, but also as a display apparatus which can be connected with a network, and it is possible to successively display the information of static images for the purpose of advertisement, propaganda, notice and the like from a distant place through the network, and further in a plurality of places simultaneously.

Further, it is an object of the present invention to provide an ink used in the above-mentioned image display apparatus.

For attaining the above objects, the image display apparatus according to the present invention is characterized in that it has the following construction.

Specifically, the image display apparatus of the present invention is an image display apparatus for displaying an image on a recording medium using an ink, comprising: ink application means for applying an ink containing a polymer onto said recording medium in accordance with image data; and image erasing means for erasing the image by coming in contact with the image formed on said recording medium by said ink application means and the subsequent separation, wherein, when the solubility parameter (SP value) of the polymer substance remaining on said recording medium after applying the ink is taken as $SP_p$, the SP value of the substance constituting the surface of said recording medium is taken as $SP_m$, and the SP value of the substance constituting the surface of said image erasing means is taken as $SP_c$, said $SP_p$, $SP_m$ and $SP_c$ satisfy the relationship: $|SP_p-SP_m|>|SP_p-SP_c|$.

Further, the image erasing method according to the present invention is characterized in that it has the following construction.

Specifically, the image erasing method of the present invention is a method comprising the steps of: contacting a substance for erasing an image with the image formed by applying an ink containing a polymer; and subsequently separating the substance for erasing an image from the recording medium, to thereby erase the image on the recording medium, wherein, when the solubility parameter (SP value) of the polymer substance remaining on the recording medium after applying the ink is taken as $SP_p$, the SP value of the substance constituting the surface of the recording medium is taken as $SP_m$, and the SP value of said substance for erasing an image is taken as $SP_c$, said $SP_p$, $SP_m$ and $SP_c$ satisfy relationship: $|SP_p-SP_m|>|SP_p-SP_c|$.

Further, the image display apparatus according to the present invention is characterized in that it has the following construction.

Specifically, the image display apparatus of the present invention is an image display apparatus comprising: an ink-jet head capable of discharging an ink containing a polymer emulsion; a recording medium having a hard permeability for said ink, for displaying an image made of said ink; and an ink release means capable of releasing said ink from said recording medium by coming in contact with the ink on said recording medium and the subsequent separation, wherein the substance constituting the surface of said ink release means is selected so that the attractive force exhibited between said ink and the surface of said ink release means is stronger than that exhibited between said ink and said recording medium.

Further, the ink according to the present invention is characterized in that it has the following construction.

Specifically, the ink of the present invention is an ink used in an image display apparatus for displaying an image on a display sheet by discharging an ink from an ink-jet recording head, wherein said ink comprises at least one selected from the group consisting of a glycol and an alcohol, a polymer emulsion, and a pigment, wherein said ink contains 0 to 10% by weight of said glycol, 0 to 20% by weight of said alcohol, 0.001 to 0.5% by weight of said polymer emulsion, and 1 to 10% by weight of said pigment, based on the total weight of said ink.

It should be noted that the SP value in the present specification means a solubility parameter, and the solubility parameter can be used as an index for an adhesive force. This solubility parameter is defined in "McGraw-Hill Dictionary of Scientific and Technical Terms" (edited by Editorial Committee of McGraw-Hill Dictionary of Scientific and Technical Terms, published by The Nikkan Kogyo Shinbun Ltd., Japan). Further, in "Adhesive Handbook" (edited by Japan Adhesive Society, published by The Nikkan Kogyo Shinbun Ltd., Japan) and the like, there is a description reading "The closer the SP values of substances, the easier the adhesion between the substances."

Further, the SP value used in the present specification is, as described in pages 7 to 23 of the above-mentioned "Adhesive Handbook", defined by the following formula:

$$SP=(C.E.D)^{1/2}=(\Delta H-RT/V)^{1/2}$$

wherein:

C.E.D is a cohesive energy density (cal/cm$^3$);

$\Delta H$ is heat of vaporization (cal/mol);

V is a molar volume (cm$^3$/mol);

R is gas constant (cal/deg·mol); and

T is an absolute temperature (deg·K).

(Note that "deg" is an abbreviation of degree.)

It should be noted that the "polymer dispersion" in the present specification means a state such that a polymer is dispersed in a liquid, and hereinafter, the "polymer dispersion" is referred to also as polymer emulsion.

In addition, the above-mentioned polymer means a substance having a molecular weight of 1,000 or more in the present specification.

Further, the "recording medium having a hard permeability" in the present specification means a recording medium having water permeability P (g/m$^2$, 24 hr) which satisfies the relationship: 1<P<25, wherein the water permeability can be measured in accordance with JIS K5400 (1990) 8.16.

BRIEF DESCRIPTION OF THE DRAWINGS

FIG. 6 is a block diagram showing one example of the construction of the control system in an image display device according to one embodiment of the present invention.

FIG. 7 is a flow chart showing the recording operation and the erasing operation of the image in an image display device according to one embodiment of the present invention.

DETAILED DESCRIPTION OF THE PREFERRED EMBODIMENTS

Hereinbelow, an embodiment of the present invention will be described in detail with reference to the drawings. The image display device in the present embodiment is an image display device for displaying an image made of ink on a recording medium using an ink which can be fixed on and released from the recording medium having a hard permeability. Further, the image display device comprises ink-jet recording means for discharging the above-mentioned ink on the recording medium, and image erasing means for releasing the ink from the recording medium.

The fixing and the release of the ink in the present invention largely depends on the three materials for the ink, the recording medium surface and the image erasing means surface. Particularly, with respect to the fixing, the physical properties of the ink (the physical properties and the content of the polymer emulsion contained in the ink) has effects, and with respect to the release, the relationship between the SP values of the above three materials has effects.

Firstly, the ink used in the present invention is explained. The ink of the present invention mainly comprises a liquid medium, a polymer emulsion for ensuring the fixing property, and a pigment for ensuring the release property.

The first feature of the ink of the present invention is to contain a polymer emulsion. The polymer emulsion contained in the ink of the present invention is one in which a water-insoluble polymer is dispersed in a liquid medium containing water as a main component. It should be noted that, as the polymer emulsion used in the present invention, any conventional polymer emulsion can be used; however, the below-described vinyl acetate polymer emulsion and acrylic polymer emulsion are preferred.

As mentioned above, in the present invention, a water-insoluble (hydrophobic) polymer is added to an ink. By contrast, when a water-soluble (hydrophilic) polymer is added to an ink according to the conventional method, the hydrophilic polymer is dissolved in the ink, causing increase in the viscosity of the ink. Thus, there is a danger that the ink cannot be discharged from the ink-jet nozzle. Therefore, the amount of the hydrophilic polymer added has been limited.

On the other hand, in the present invention, since a water-insoluble polymer is added in the ink, the viscosity of the ink does not rise. This is because the water-insoluble polymer is present in the ink as an emulsion. Therefore, the polymer emulsion can be added to the ink at a relatively high concentration. When the polymer emulsion is added at a high concentration, the fixing property is improved, so that the ink is excellently fixed on the recording medium, and thus, this is preferable.

Figure 10:
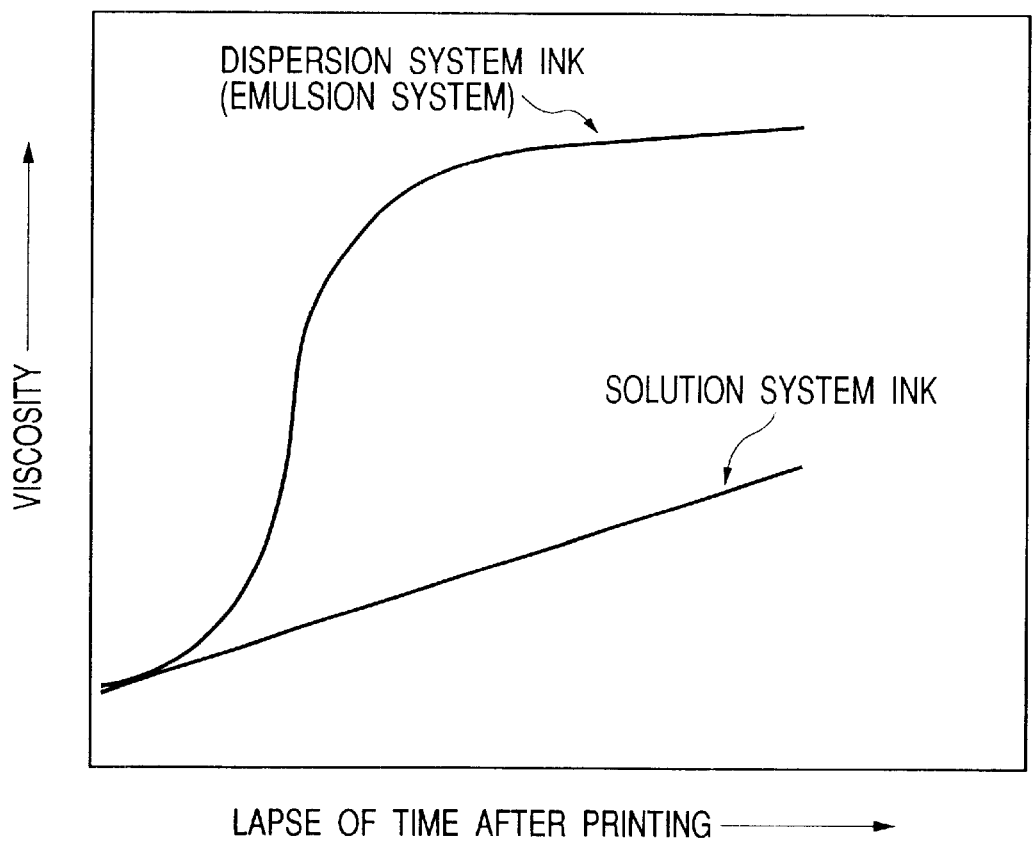
FIG. 10 is a view showing, with respect to each of the polymer dispersion system ink and the polymer solution system ink, relationship between the lapse of time after the ink is applied onto the recording medium and the change in viscosity in accordance with the lapse of time.
Figure 11:
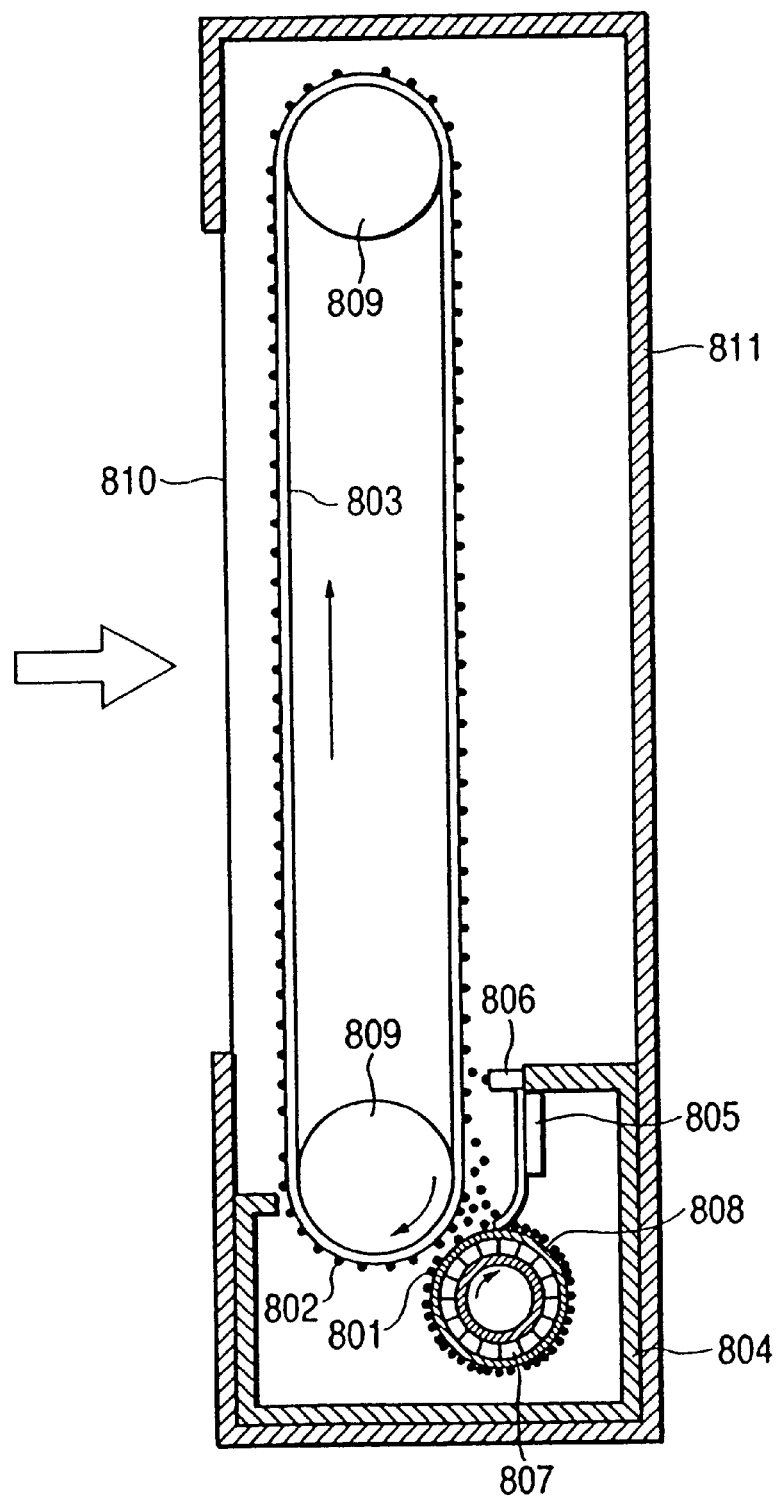
FIG. 11 is a cross-sectional view of the conventional information board.
Figure 12:
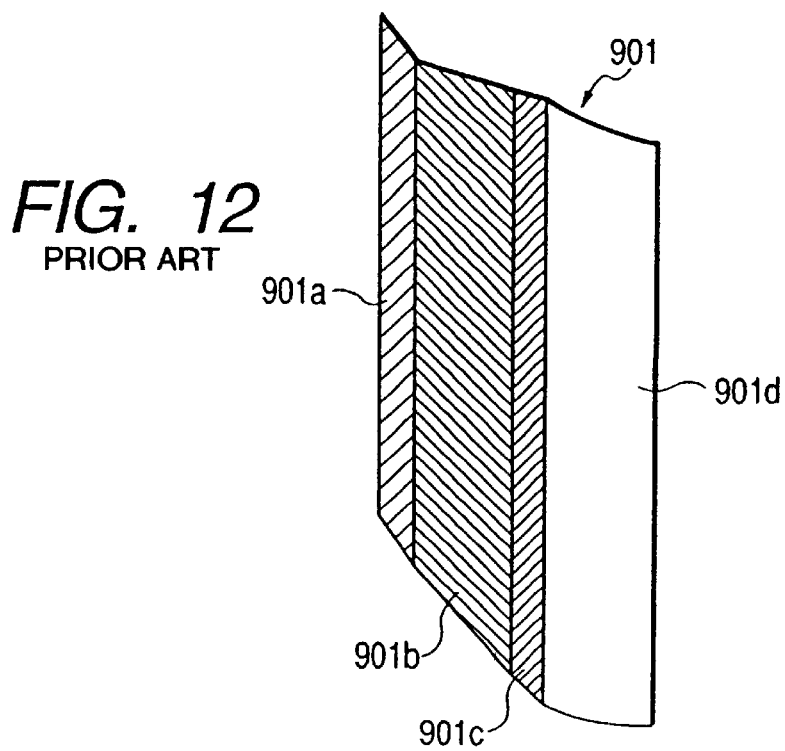
FIG. 12 is a partially sectional view of the recording medium used in the conventional information board.
Figure 13A:
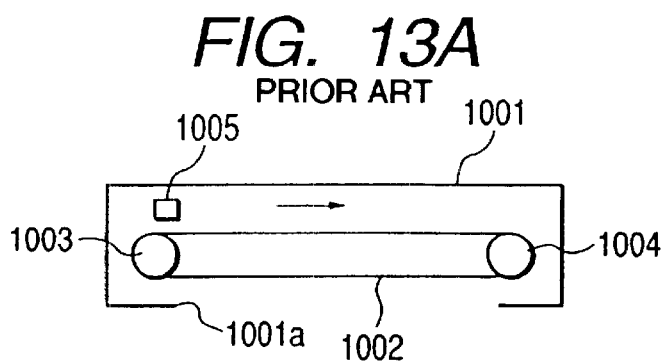
FIGS. 13A, 13B and 13C are diagrammatic views showing the construction of the conventional electronic blackboard.
Figure 13B:
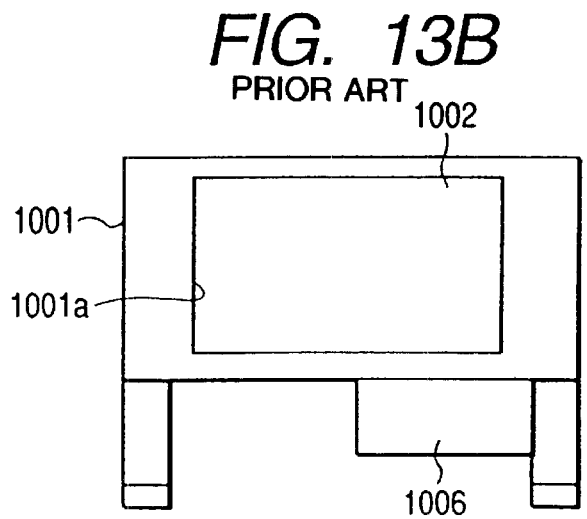
Figure 13C:
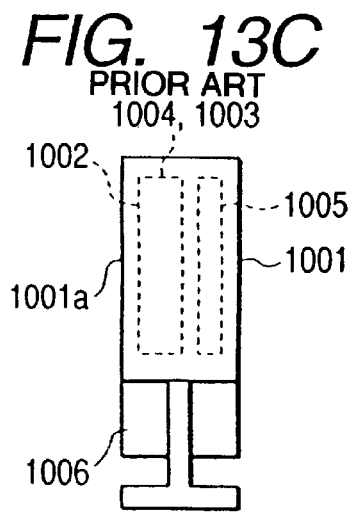

When the polymer is added to a relatively high concentration as mentioned above, the viscosity of the ink containing a water-soluble polymer (polymer solution system ink) disadvantageously rises, and therefore, the discharge property from the ink-jet head is not very good. However, in the ink of the present invention which contains a water-insoluble polymer (polymer dispersion system ink), the viscosity does not become so high, and therefore, the discharge property from the ink-jet head is good. Further, the viscosity of the polymer dispersion system ink of the present invention rapidly rises after the fixing on the recording medium, and thus, the fixing property is also good. As mentioned above, the polymer dispersion system ink having excellent discharge property from the ink-jet head and an excellent fixing property on the recording medium is an optimal ink for realizing the present invention in which the discharge property and the fixing property are requirements. It is noted that FIG. 10 is a view showing, with respect to each of the polymer dispersion system ink and the polymer solution system ink, how the viscosity of the ink changes after application onto the recording medium, namely, the relationship between the lapse of printing time and the viscosity. Also as apparent from FIG. 10, even when the viscosities are substantially the same at the discharging, there is a difference in the rising ratio of the viscosity between the dispersion system ink and the solution system ink. In either ink, after the fixing, the solvent in the ink is evaporated, and therefore, the viscosity rises; however, in the dispersion system ink, immediately after applying onto the recording medium, the interaction between the polymer particles becomes strong. As a result, the viscosity rapidly rises, and hence, it becomes possible to achieve a secure fixing on the recording medium. On the other hand, in the solution system ink, the viscosity does not become so high, and therefore, the fixing on the recording medium is unstable.

Herein, the reason why the ink of the present invention is excellently fixed on the recording medium is shown below. Firstly, this is because there is an effect such that, immediately after the printing, the polymer emulsion in the ink interacts with the hydrophobic surface of the recording medium and adsorbs on the above surface. This is caused by the fact that both of the polymer emulsion and the recording medium surface are hydrophobic and the hydrophobic materials readily adhere to each other.

Secondly, the reason is because the above adsorbing force is extremely week, but there is an effect such that, when the glass transition temperature of the polymer in the polymer emulsion as measured by differential scanning calorimeter is 0° C. or less, the adhesive force of the above polymer is exerted on the recording medium surface under the ordinary service conditions and it is possible to prevent the ink image from flowing on the recording medium surface before the liquid medium of the ink is dried.

Thirdly, the reason is because the emulsion polymer particles are contacted with each other to form a film in accordance with the evaporation of the liquid medium, causing the fixing property to be enhanced. This film formation also contributes to the improvement of the release property of the ink image formed. The reason why the ink of the present invention exhibits excellent fixing property relative to the recording medium is presumed as follows.

The acrylic polymer emulsion and the vinyl acetate polymer emulsion preferably used in the present invention can be discharged in an ink-jet mode, and exhibit both of excellent print fixing property and excellent image release property. The amount used is in the range of 0.001 to 0.5% by weight, more preferably 0.01 to 0.2% by weight, based on the total weight of the ink liquid. When the amount of the polymer emulsion used is less than the above range, the ink does not exhibit satisfactory fixing property (due to a lack in the fixing property) and the ink cannot be excellently fixed on the recording medium, causing muddiness, the mixing of different colors and the like to occur due to flowing of the ink, and thus, this is not preferable. On the other hand, when the amount exceeds the above range, the viscosity of the ink disadvantageously becomes large and the clogging of a nozzle, the reduction of the discharged ink amount, and the like occur, and thus, this is not preferable from the viewpoint of the ink-jet discharging property. Further, the polymer emulsion per se in the present invention is adhesive.

As a raw material monomer to be the skeleton of the above-mentioned polymer emulsion, there can be mentioned, for example, $C_1$–$C_{30}$ alkyl or cycloalkyl esters of acrylic acid or methacrylic acid, such as vinyl acetate, methyl acrylate, ethyl acrylate, n-propyl acrylate, isopropyl acrylate, (n-, i-, t-)butyl acrylate, hexyl acrylate, 2-ethylhexyl acrylate, n-octyl acrylate, decyl acrylate, lauryl acrylate, stearyl acrylate, cyclohexyl acrylate, methyl methacrylate, ethyl methacrylate, n-propyl methacrylate, isopropyl methacrylate, (n-, i-, t-)butyl methacrylate, hexyl methacrylate, 2-ethylhexyl methacrylate, n-octyl methacrylate, decyl methacrylate, lauryl methacrylate, stearyl methacrylate, cyclohexyl methacrylate, and the like; $C_2$–$C_{18}$ alkoxyalkyl esters of acrylic acid or methacrylic acid, such as trimethoxybutyl acrylate, methoxyethyl acrylate, ethoxybutyl acrylate, trimethoxybutyl methacrylate, methoxyethyl methacrylate, ethoxybutyl methacrylate, and the like; and $C_2$–$C_8$ hydroxyalkyl esters of acrylic acid or methacrylic acid, such as 2-hydroxyethyl acrylate, hydroxypropyl acrylate, hydroxybutyl acrylate, 2-hydroxyethyl methacrylate, hydroxypropyl methacrylate, hydroxybutyl methacrylate, and the like. However, the monomer is not limited to these.

The polymer is formed by copolymerizing the above-mentioned monomers; however, a polymer formed by copolymerizing a plurality of the above-mentioned monomers in an appropriate proportion may also be used. Further, a polymer obtained by mixing polymers each of which is formed by homopolymerizing the above-mentioned monomer may also be used.

Further, when the above-mentioned monomer is copolymerized with an anionic monomer, a nonionic monomer, a cationic monomer or the like, the resultant polymer becomes hydrophilic and has a function as an emulsifier. As a result, the dispersion stability of the emulsion itself and the below-mentioned pigment is improved. Therefore, it is possible to reduce the concentration of the surfactant added and the dispersant added, such as, a water-soluble polymer or the like, and further, there are effects such that the ink-jet discharging property of the ink, the fixing property on the recording medium and the like are improved.

Examples of anionic monomers include, for example, acrylic acid, methacrylic acid, maleic anhydride, itaconic acid, sodium styrenesulfonate, and the like.

Examples of nonionic monomers include, for example, a styrene monomer system, acrylonitrile, hydroxyalkyl (meth) acrylate, vinyl acetate, alkyl vinyl ether, (meth)acrylic acid ester, and the like.

Examples of cationic monomers include, for example, dimethylaminoethyl (meth)acrylate, diethylaminoethyl (meth)acrylate, dimethylaminopropyl (meth)acrylate, vinylimidazole, vinylpyridine, vinylpyrrolidone, vinylsuccinimide and the like, and quaternization compounds of these.

The above-mentioned ionic monomers can be used in an amount range such that the resultant copolymer is substantially not dissolved in the liquid medium of the ink.

Further, in the copolymerization, crosslinkable monomers, such as a divinyl compound, a polyvalent acrylate compound, a diene system compound, a dihydrodicyclopentadienyl group-containing (meth)acrylic acid ester, an epoxy group-containing ethylenically unsaturated compound, and the like; and crosslinking agents, such as an aziridine system crosslinking agent, a block type or self-emulsifiable type isocyanate system crosslinking agent, a carbodiimide system crosslinking agent, a metallic system crosslinking agent, and the like, may be added.

When the above-mentioned emulsion is prepared, for improving the dispersion stability of the emulsion, an emulsifier may be added. As the above-mentioned emulsifier, there is no particular limitation, and for example, there can be mentioned anionic emulsifiers, such as a dodecylbenzenesulfonate, an alkylsulfate, a polyoxyethylene alkylphenyl ether sulfonate, and the like, as well as nonionic emulsifiers, such as a polyoxyethylene alkylphenyl ether, a polyoxyethylene alkyl ether, and the like.

Further, a tackifier resin may be added to the above-mentioned polymer emulsion. Examples of tackifier resins include, for example, rosin system tackifier resins, such as gum rosin, tall oil rosin, wood rosin, polymerized rosin, hydrogenated rosin, disproportionated rosin, rosinate, polymerized rosinate, hydrogenated rosinate, disproportionated rosinate, rosin-modified phenolic resin, and the like, terpene resins, hydrogenated terpene resins, phenolic resins, terpene phenol resins, hydrogenated terpene phenol resins, xylene resins, aliphatic petroleum resins, alicyclic petroleum resins, aromatic petroleum resins, coumarone resins, styrene system resins, and the like.

Further, if necessary, various types of additives, such as an antioxidant, a light stabilizer, a preservative, a colorant and the like, may be added to the polymer emulsion.

As mentioned above, the polymer contained in the polymer emulsion, having a low glass transition temperature, has an adhesion, and therefore, the fixing property relative to the recording medium is good. Thus, in the present invention, as the polymer contained in the polymer emulsion, one which has a glass transition temperature of 0° C. or less as measured by differential scanning calorimeter is used.

Among commercial available polymer emulsions, as the polymer having a glass transition temperature of 0° C. or less, there can be mentioned, for example, NX148, manufactured/sold by Mitsubishi Rayon Co., Ltd. (−49° C.), NX149 (−45° C.), SK Dain AN49B, manufactured/sold by Soken Chemical & Engineering Co., Ltd. (−48°C.), SK Dain E03H (−69° C.), SK Dain RE330 (−78° C.), Teisan resin A3611, manufactured/sold by Teikoku Kagaku Sangho K. K. (−32° C.), Teisan resin NFA369TB (−35° C.), Teisan resin NFA37ON (−32° C.) and the like. It should be noted that the above-mentioned figures in parentheses indicate the glass transition temperature of the polymer.

The above-mentioned polymer emulsion also functions as a dispersant for the pigment in the present invention; however, it is preferred that, in addition to this polymer emulsion, as a dispersant for the pigment, a water-soluble resin or a surfactant is further added.

With respect to the water-soluble resin, there is no particular limitation. However, the water-soluble resin having a weight average molecular weight in the range of 1,000 to 30,000 is preferable, more preferably in the range of 3,000 to 15,000. Specific examples of water-soluble resins include block copolymers, graft copolymers, random copolymers or these salts, comprising two or more monomers, wherein at least one monomer is a hydrophilic monomer, which monomers are selected from styrene, styrene derivatives, vinylnaphthalene, vinylnaphthalene derivatives, esters of an α, β-ethylenically unsaturated carboxylic acid and an aliphatic alcohol, acrylic acid, acrylic acid derivatives, maleic acid, maleic acid derivatives, itaconic acid, itaconic acid derivatives, fumaric acid, and fumaric acid derivatives.

These water-soluble resins are insoluble in an acidic to neutral liquid medium; however, these are preferably alkali-soluble type resins which are soluble in an aqueous solution having a base dissolved therein. Since the alkali-soluble type resin is substantially not dissolved in the ink liquid medium, the resin is advantageous in that it is possible to reduce the viscosity of the ink, and it is easily dispersed. In addition, the water-soluble resin may be a homopolymer composed of hydrophilic monomers or a salt thereof. Further, water-soluble resins, such as polyvinyl alcohol, carboxymethyl cellulose, naphthalenesulfonic acid formaldehyde condensation product and the like, can also be used as long as the ink viscosity does not rise to too high an extent.

Further, for increasing the image concentration made of ink, it is especially preferred to use the water-soluble resin which begins to undergo coagulation or condensation at a pH of 6 or less. It is noted that the above-mentioned water-soluble resin is preferably contained in the range of 0.1 to 5% by weight, based on the total weight of the ink liquid. In addition, since the above-mentioned water-soluble resin is in a state such that it is dispersed in the pigment ink in the present invention, the viscosity is low, as compared to the case where the water-soluble resin is added to a dye ink. Therefore, it is suitable for the discharging from an ink-jet nozzle.

It should be noted that with respect to the method for polymerizing the above-mentioned monomers, there is no particular limitation. However, there can be mentioned, for example, a solution polymerization method, an ultraviolet-ray (UV) polymerization method, an emulsification polymerization method, a suspension polymerization method and the like. In the above-mentioned polymerization methods, with respect to the polymerization initiator used, there is no particular limitation. However, for example, there can be mentioned persulfates, such as potassium persulfate, ammonium persulfate and the like; water-soluble azo compounds, such as azobiscyanovalerianic acid and the like; and redox system polymerization initiators in which hydrogen peroxide or the like and a reducing agent are used in combination. The amount of the above-mentioned polymerization initiator added is about 0.01 to 1 part by weight, relative to 100 parts by weight of the above-mentioned (meth)acrylic monomer. Further, the weight average molecular weight of the above polymerization initiator is preferably in the range of some tens thousand to some hundreds thousand because the adhesion is appropriate.

The second feature of the ink of the present invention is to use a pigment as a colorant. As a marker ink for white board, a pigment ink has been conventionally used utilizing the poor fretting property thereof, i.e., nature such that it is easily released. In the present invention, by adding a polymer emulsion to the pigment ink, the dispersion property of the pigment in the ink becomes good, and further, the fixing property on the recording medium having a hard permeability has been improved. The amount of the above-mentioned pigment added is 1 to 10% by weight, more preferably 5 to 8% by weight, based on the total weight of the ink. The amount of the pigment added which falls within the above range is preferable from the viewpoints of the ink discharging stability, the color reproducibility and the like. Further, the amount of the pigment added is appropriately adjusted within the above-mentioned range in accordance with the spectral reflection concentration and the color valance of the pigment, and further, the printing density.

As the pigment usable in the present invention, there can be mentioned the following.

As the pigment usable in a black ink, carbon black is preferred, and, especially preferred is carbon black, which is produced by a furnace method or channel method, has a primary particle size of 15 to 40 μm, a specific surface area of 50 to 300 m$^2$/g as measured by a BET method, a DBP oil absorption of 40 to 150 ml/100 g, a volatile content of 0.5 to 10%, and a pH of 2 to 9. As such carbon black, for example, commercially available products, such as, in a trade name, NO. 2300, NO. 900, MCF. 88, NO. 33, NO. 40, NO. 45, NO. 52, MA7, MA8, NO. 2200B (the above, manufactured/sold by Mitsubishi Chemical Corporation), RAVEN1255 in (manufactured/sold by Colombia Colo.), REGAL400R, REGAL330R, REGAL660R, MOGUL L (the above, manufactured/sold by Cabott Co.), Color Black FW1, Color Black FW18, Color Black S170, Color Black S150, Printex 35, Printex U (the above, manufactured/sold by Tegussa Co.), and the like, may be used, and any products newly produced for the present invention may also be used.

As the pigments used in the yellow ink, C. I. Pigment Yellow 1, C. I. Pigment Yellow 2, C. I. Pigment Yellow 3, C. I. Pigment Yellow 13, C. I. Pigment Yellow 16, C. I. Pigment Yellow 83 and the like can be used, but any products newly produced for the present invention can also be used.

As the pigments used in the magenta ink, C. I. Pigment Red 5, C. I. Pigment Red 7, C. I. Pigment Red 12, C. I. Pigment Red 48 (Ca), C. I. Pigment Red 48 (Mn), C. I. Pigment Red 57 (Ca), C. I. Pigment Red 112, C. I. Pigment Red 122 and the like can be used, but any products newly produced for the present invention can also be used.

As the pigments used in the cyan ink, C. I. Pigment Blue 1, C. I. Pigment Blue 2, C. I. Pigment Blue 3, C. I. Pigment Blue 15, C. I. Pigment Blue 16, C. I. Pigment Blue 22, C. I. Vat Blue 4, C. I. Vat Blue 6 and the like can be used, but any products newly produced for the present invention can also be used.

For stably discharging the pigment ink of the present invention having a polymer emulsion added in an ink-jet mode, a glycol and/or an alcohol is added. By adding these glycol and/or alcohol to the ink, it is possible to adjust the moisture retention property of the ink before discharging and the surface tension immediately after printing. The amount of the glycol added may affect the viscosity of the ink and the fixing property of the ink on the recording medium. In addition, the amount of the alcohol added may affect the surface tension. In the present invention, the amount of the glycol added is 0 to 10% by weight, more preferably 2 to 8% by weight, based on the total weight of the ink, and the amount of the alcohol added is 0 to 20% by weight, more preferably 2 to 10% by weight, based on the total weight of the ink. It should be noted that glycol and alcohol have partially similar addition effect as is apparent from the molecular structures thereof. Therefore, there is a case where, if either one is added, the other need not to be added. In other words, it is necessary that at least one selected from a glycol and an alcohol be contained in the ink.

As a glycol, an alkylene glycol containing an alkylene group having 2 to 6 carbon atoms is preferred. For example, there can be mentioned ethylene glycol, propylene glycol, butylene glycol, triethylene glycol, 1,2,6-hexanetriol, thiodiglycol, hexylene glycol, diethylene glycol and the like. It is noted that a glycol has effects, such as the prevention of nozzle clogging, the moisture retention property, the dispersion stability and the like.

As an alcohol, an alkyl alcohol having 1 to 4 carbon atoms is preferred. For example, there can be mentioned aliphatic monoalcohols, such as methyl alcohol, ethyl alcohol, n-propyl alcohol, isopropyl alcohol, n-butyl alcohol, sec-butyl alcohol, tert-butyl alcohol and the like.

Further, it is desired that the ink of the present invention is adjusted to be neutral or alkaline as a whole of the ink. This is because, by adjusting the whole of the ink to be neutral or alkaline, the solubility of the above-mentioned water-soluble resin can be improved, and it is possible to allow the ink to exhibit excellent long-term shelf stability. It should be noted that, in this case, when the pH value of the ink liquid is too high, there is a danger that the viscosity of the ink rises to too high an extent due to the complete dissolution of the water-soluble resin, and that the corrosion of various parts used in the ink-jet recording means is caused. Therefore, the pH is preferably in the range of 7 to 10.

Further, as a pH adjuster, for example, there can be mentioned various types of organic amines, such as diethanolamine, triethanolamine and the like; inorganic alkalis including hydroxides of an alkali metal, such as sodium hydroxide, lithium hydroxide, potassium hydroxide and the like; organic acids; mineral acids; and the like.

The liquid medium preferable in the ink of the present invention is a mixed solvent of water and a water-soluble organic solvent. As water, general water containing various ions is not used, but ion-exchanged water (deionized water) is preferably used. Further, as a water-soluble organic solvent, there can be used amides, such as dimethylformamide, dimethylacetamide and the like; ketones or ketalcohols, such as acetone, diacetone alcohol and the like; ethers, such as tetrahydrofuran, dioxane and the like; and N-methyl-2-pyrrolidone, 1,3-dimethyl-2-imidazolidinone and the like.

Further, as the liquid medium for the ink, a mixed solvent obtained by adding to water a water-soluble organic solvent, such as a polyhydric alcohol or alkyl ether thereof or the like, may be used. As the polyhydric alcohol or alkyl ether thereof, there can be mentioned polyalkylene glycols, such as polyethylene glycol, polypropylene glycol and the like; glycerol; lower alkyl ethers of polyhydric alcohol, such as ethylene glycol monomethyl(or monoethyl)ether, diethylene glycol monomethyl(or monoethyl)ether, triethylene glycol monomethyl(or monoethyl)ether, and the like.

The major components constituting the ink used in the present invention are as mentioned above; however, if necessary, urea, a surfactant, a defoamer, a preservative and the like may be further added.

As the surfactant usable in the present invention, there can be mentioned anionic surfactants, such as a fatty acid salt, a higher alcohol sulfate ester, a liquid fatty oil sulfate ester, an alkylarylsulfate and the like; and nonionic surfactants, such as a polyoxyethylene alkyl ether, a polyoxyethylene alkyl ester, a polyoxyethylene sorbitan alkyl ester and the like, and, among these, one or two or more can be appropriately selected and used. The amount of this surfactant contained is desirably 0.01 to 5% by weight, based on the total weight of the ink.

Further, in this case, it is preferred that the amount of the surfactant added is determined so that the surface tension of the ink becomes 35 dyne/cm or more. This is because, in the ink-jet recording method as employed in the present invention, when the surface tension of the ink becomes a value smaller than this, there occur unfavorable phenomena for the recording of an image, such as the printing deviation due to the leakage at the tip of a nozzle (deviation of the landing point of an ink drop), and the like.

One preferred example of the method for preparation of the ink used in the present invention is shown below; however, the ink preparation method is not limited to this.

A water-soluble resin and distilled water are heated to 70° C., so that the resin is completely dissolved. In this case, when the concentration of the resin to be dissolved is low, the resin is often not dissolved uniformly. Therefore, it is preferred that, in the dissolution of the resin, a high concentration resin solution is preliminarily prepared, and this is diluted to prepare a desired resin solution. It is noted that, instead of the water-soluble resin, a surfactant can also be used.

To this solution are added a pigment and an aliphatic monoalcohol (such as ethanol or the like), and premixing is performed, followed by dispersion treatment. As the dispersing machine used in the dispersion treatment, any dispersing machine which has been generally used can be used; however, for example, there can be mentioned a ball mill using a ceramic ball or a steel sphere, a roll mill, a sand mill using glass beads or ceramic beads, and the like. Of these, a high speed type sand mill is preferred, and, for example, there can be mentioned Super Mill, Sand Grinder, Beads Mill, Agitator Mill, Glen Mill, Daino Mill, Pearl Mill, Cobol Mill (all of which are trade names), and the like. As the beads used in the sand mill, glass beads, ceramic beads, zirconium beads and the like, each having a diameter of 1 mm to 1.5 mm, can be used.

As the conditions for the preparation of the above-mentioned dispersion liquid for ink, the following example is preferred.

Dispersing machine: Sand grinder (manufactured/sold by Igarashi Kikai)

Grinding media: Glass beads or zirconium beads, 1 mm diameter

Packing ratio of grinding media: 50% (by volume)

Grinding time: 3 to 4 hrs

After the dispersion treatment is performed under such conditions, a centrifugal treatment (preferable conditions: number of revolutions: 12,000 rpm; treatment time: 15 to 20 min) is further conducted, so that coarse particles are removed, to thereby prepare a dispersion liquid having a particle size of 100 nm to 200 nm. As a dispersing machine, in addition to the above, pearl mill (manufactured/sold by Ashizawa Co.; discharging speed: 100 ml/min) may be used.

The total content of the pigment and the water-soluble in the dispersion liquid is preferably 5 to 30% by weight, more preferably 10 to 30% by weight, based on the total weight of the dispersion liquid. The reason for this resides in that, when the pigment and the water-soluble resin are present in the dispersion liquid in a predetermined concentration or more, it is possible to efficiently perform dispersion, so that an optimal dispersion state can be obtained.

Next, into this dispersion liquid are mixed a polymer emulsion, a water-soluble organic solvent, ion-exchanged water and the like, followed by stirring for about 1 hour. As a method for obtaining a pigment having a desired particle distribution, there can be mentioned a method in which the size of the grinding media in the dispersing machine is reduced; a method in which the packing ratio of the grinding media is increased; a method in which the treatment time is prolonged; a method in which the discharging speed is lowered; a method in which, after grinding, a classification is performed using a filter, a centrifugal separator or the like; and the combination of these methods. Further, a monomer which is a raw material for the polymer emulsion may be mixed into the pigment dispersion liquid and stirred in place of mixture of a polymer emulsion into the pigment dispersion liquid, to perform polymerization in that state. As mentioned above, the pigment emulsion ink of the present invention can be prepared.

By the use of the above-mentioned pigment emulsion ink having an adhesion, it becomes possible to excellently fix the ink on the recording medium having a hard permeability. In addition, this pigment emulsion ink can be excellently discharged from an ink-jet head.

Figure 1:
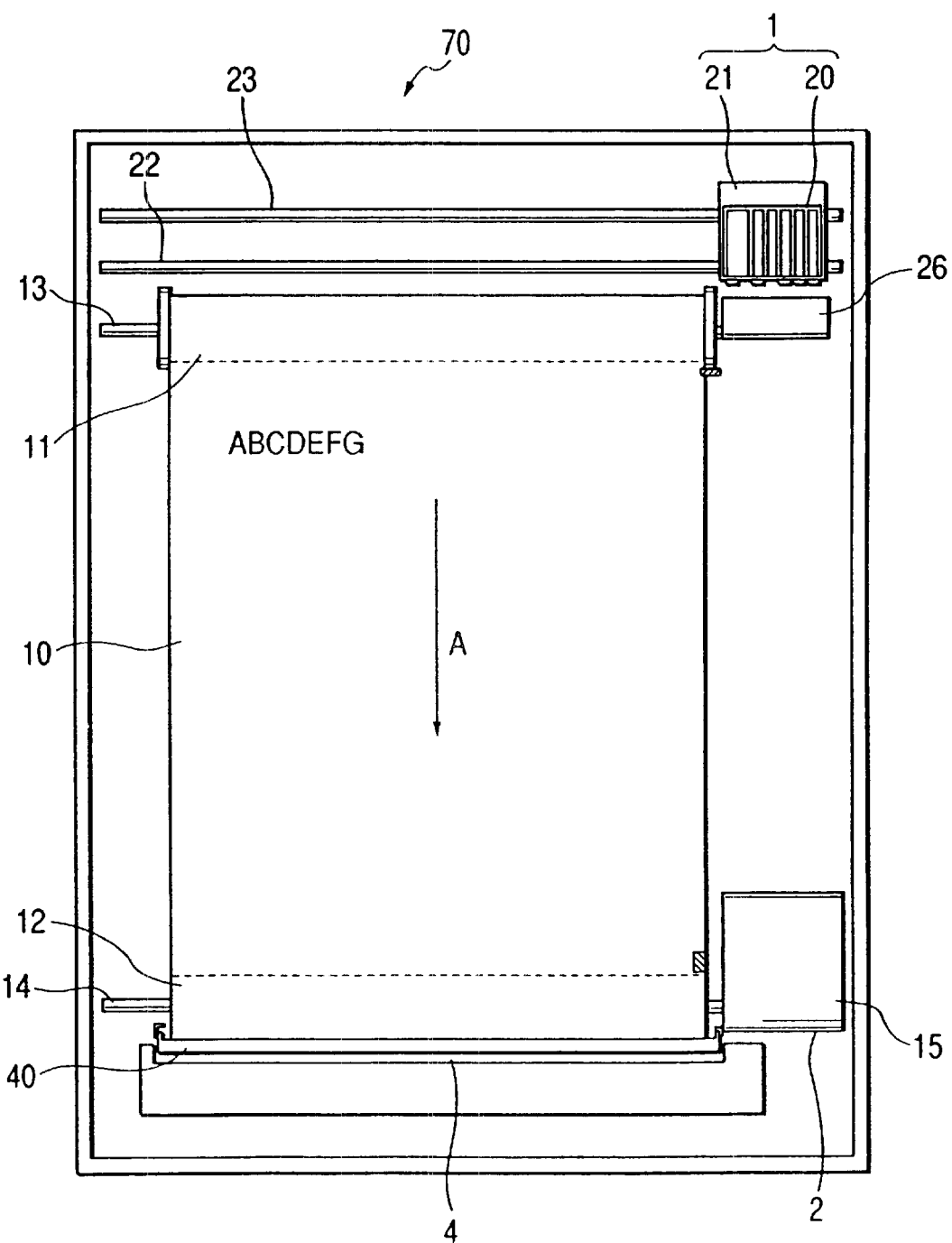
FIG. 1 is a front view of an image display device according to one embodiment of the present invention.

Next, one example of an image display device (hereinafter, referred to also as electronic blackboard) of the present invention is explained. FIG. 1 is a diagrammatic front view of an image display device according to the present invention, and FIG. 2 is a diagrammatic side view of an image display device according to the present invention.

Figure 2:
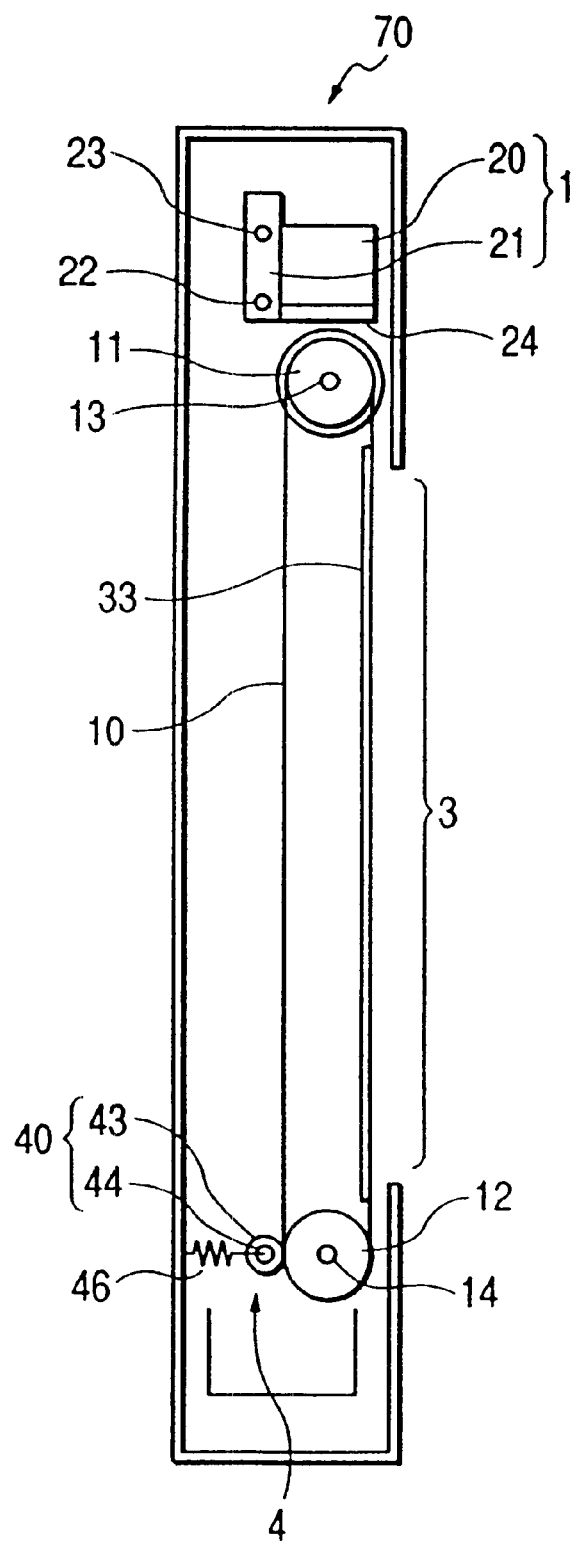
FIG. 2 is a side view of an image display device according to one embodiment of the present invention.

In FIG. 1 and FIG. 2, reference numeral 1 designates image writing means, numeral 2 designates a recording medium driving unit, 3 designates a display unit, and 4 designates image erasing means. 10 designates a recording medium (display sheet), and is stretched in an endless form by roller 11 and roller 12 which are rotatably shaft-supported on the not shown side plate. 13, 14 designate shafts of rollers 11, 12, respectively. 15 designates a roller driving unit for driving roller 12 which moves display sheet 10, and incorporates therein a stepping motor and drives roller shaft 14 to move display sheet 10. 70 designates the whole of the image display device.

Figure 3:
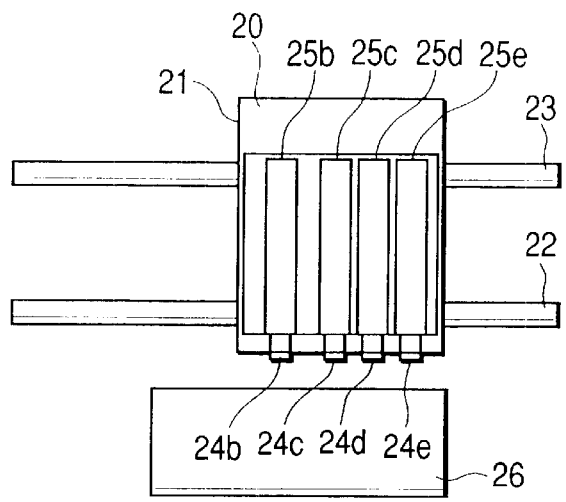
FIG. 3 is a diagrammatic view showing one example of the image writing means used in the present invention.
Figure 4:
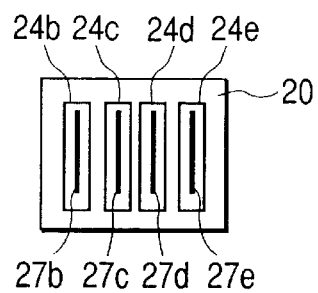
FIG. 4 is an enlarged view of the front of the recording head group.

FIG. 3 is a diagrammatic view of image writing means 1, and FIG. 4 is an enlarged view of the front of recording head group 24. Image writing means 1 comprises recording head unit 20 and carriage 21 having mounted thereon the above unit. Carriage 21 has a construction such that it is movable in the direction (main scanning direction) defined by two guide shafts 22, 23, and reciprocally scans on display sheet 10. On carriage 21, there are mounted recording head unit 20 comprising recording head group 24 for discharging four color inks of black (Bk), cyan (C), magenta (M) and yellow (Y), and ink tank 25 (Bk tank 25b, C tank 25c, M tank 25d, and Y tank 25e) for supplying an ink to respective recording heads 24. Each ink tank 25 is connected with recording head group 24 through a connection part for recording head group 24, and supplies an ink to recording head group 24. In addition, as apparent from FIG. 4, recording head group 24 comprises Bk ink discharging head 24b, C ink discharging head 24c, M ink discharging head 24d, and Y ink discharging head 24e. Further, each head independently comprises 256 nozzles 27.

At the right-hand end of the front of the region where carriage 21 is movable, there is recovery system unit 26, and ink suction means and wiping means are set for capping nozzle 27 of recording head 24 with the not shown cap member when recording is not performed, and for cleaning nozzle 27 of recording head 24 or around the nozzle. Generally, the position at which recording unit 20 stands by on recovery system unit 26 is referred to as home position.

It is noted that as the above-mentioned image writing means 1 in the present invention, an ink-jet head is preferably used. Further, among the ink-jet recording methods, especially preferred is a bubble-jet method in which the recording is performed by forming thin liquid drops using heat energy; however, the recording method is not limited to this. For example, various types of ink-jet methods, such as an electrostatic suction method by the application of a high voltage, a method in which a mechanical vibration or displacement is applied to the ink using a piezoelectricity element, and the like, can be utilized.

Next, display sheet 10 used in the above-mentioned image display device 70 is explained. This display sheet 10 is a portion on which an image is recorded by ink-jet recording means (image writing means 1), and stretched by upper and lower rollers 11, 12 shown in FIG. 2, so that it is circulated endlessly. Further, this is a display sheet such that the above-mentioned ink can be surely fixed to display an excellent image, and further, the ink can be surely released by image erasing means 4 so as to erase the image. As the material for the surface of such a display sheet, EMMA (ethylene-methyl methacrylate), acrylic resin hard-coated PET, fluororesin-coated PET and the like are suitable. In addition, the recording surface is preferably white. It is noted that as recording medium 10 in the present invention which is needed to release the ink fixed on display sheet 10 to erase the image, a recording medium having a porous configuration such that a dye permeates through the recording medium surface is not suitable, and it has been found that a recording medium having a smooth surface is suitable. Further, a feature of this recording medium is such that the ink does substantially not permeate therethrough, namely, hard permeability.

When display sheet 10 is in the form of a endless belt, it is necessary to subject the above belt to seamless processing. As a result, the cost disadvantageously increases. Thus, a construction may be made in which winding mechanism is provided at both ends and display sheet 10 is taken up by rollers 11, 12. In this case, a mechanism is such that the both ends of display sheet 10 in a belt form are fixed on two rollers 11, 12, and further, the sheet is wound by one rotating roller 11 and carried from the other roller 12, so that display sheet 10 is scanned. When the winding of the belt of display sheet by one roller is terminated, the display sheet is returned to the initial state by reversely rotating rollers 11, 12 respectively.

Next, image erasing means 4 used in the above-mentioned image display device 70 is explained. As image erasing means, an adhesive roller is preferred, and this adhesive roller is contacted with the display sheet at a predetermined pressure so as to allow the ink on the display sheet to adhere to the adhesive roller, so that the ink can be released from the display sheet. That is, the roller is contacted with the image, and then, the roller is released (separated) from the place at which the image is present, so that the image can be erased from the display sheet. The surface of the adhesive roller capable of releasing the ink from the display sheet is needed to satisfy the requirement in respect to the SP value (solubility parameter) described below, namely, the relationship: $|SP_p-SP_m|>|SP_p-SP_c|$. Further, it is preferred that the SP value of the surface of the adhesive roller is different from that of the surface of the display sheet as largely as possible. As the material for the surface of such an adhesive roller, for example, the same polymer as that used in the emulsion contained in the above-mentioned ink can be used. Further, it is preferred that the surface of such an adhesive roller has an appropriate elasticity. For example, when an ink containing an acrylic emulsion is used as an ink, the material for the adhesive roller is preferably an acrylic polymer, and further, it is preferred that this has a glass transition temperature of around room temperature and has a partially crosslinked structure. It is noted that the preferred form of the image erasing means was explained taking a roller as an example in the above; however, the form of the image erasing means is not limited to this. The form may be a flat plate form. In the case of a flat plate form, the image erasing means is set in parallel to the recording medium, and the image erasing means is contacted with and separated from the recording medium, so that the ink on the recording medium can be released. That is, the image erasing means is moved in the direction of the recording medium at a predetermined time interval.

The present invention is, as described above, an image display device comprising an ink, a recording medium having a hard permeability (recording medium through which the ink does substantially not permeate), and image erasing means, in which it is possible to fix the ink on the recording medium having a hard permeability, and further, the ink fixed can also be released from the recording medium. In the above-mentioned device of the present invention, particularly, the requirement in respect to the solubility parameter (SP value) satisfies the relationship represented by the following formula (A):

$$|SP_p-SP_m|>|SP_p-SP_c| \qquad (A).$$

In this formula, the above-mentioned $SP_p$, $SP_m$ and $SP_c$ respectively represent the SP value of the polymer in the polymer emulsion contained in the ink, the SP value of the surface layer of the recording medium, and the SP value of the surface layer of the image erasing means.

As mentioned above, in the solubility parameter (SP value), the closer the SP values of substances, the easier the adhesion between the substances. In other words, with respect to the two substances, the smaller the absolute value of the difference in the SP values, the easier the adhesion between the substances. Specifically, the above formula (A) means that the ink is likely to adhere to the image erasing means surface rather than the recording medium surface, and this adhesive force causes the ink to be released from the recording medium surface. Further, by satisfying the above formula (A), the ink which once adheres to the image erasing means surface is not transferred to the recording medium surface again from the image erasing means surface.

In one embodiment according to the present invention, as mentioned above, the image erasing means in a roller form is pressed to the recording medium surface so as to allow the ink to adhere to the roller surface, so that the ink is released from the recording medium surface, thereby erasing the image, and when the erasing of the image is performed repeatedly, the roller surface is sometimes covered with the released ink. However, if the entire surface of the roller is covered with the released ink, the released ink strongly adheres to each other on the roller surface, and therefore, there is no problem. On the contrary, taking the function of the image erasing means into consideration, it is more preferred that the entire surface of the roller is covered with the ink. The reason for this resides in that the ink adhering to the roller surface is the same as the ink on the recording medium surface, and needless to say, the same ink has the same SP value, and thus, an adhesion between the ink easily occurs. Taking into consideration the above-mentioned fact that the closer the SP values of substances, the easier the adhesion between the substance, it is basically desired that the surface of the image erasing means and the ink are composed of the same substance. It is noted that the polymer emulsion per se contained in the above-mentioned ink has an adhesion, and the adhesion is also responsible for the adhesion between the ink.

Further, for performing an excellent ink release, the above-mentioned image erasing means has a control mechanism such that the pressure pressing to the recording medium becomes constant. The reason why such a control mechanism is provided on the image erasing means is as follows. Specifically, when the ink is deposited on the image erasing means surface in accordance with the erasing of the image, the space between the image erasing means and the recording medium becomes narrow. As a result, the pressure pressing to the recording medium varies. Therefore, for preventing this, there is provided a control mechanism for keeping the pressure constant by controlling the space between the image erasing means and the recording medium.

As mentioned above, the above-mentioned image erasing means can be used for a long term because there is almost no need of maintenance, such as exchanging, pressure adjustment and the like. It is noted that when the components of the ink used are changed, it is preferred that the image erasing means is exchanged in accordance with the change. This is because, when the ink is changed, the SP value of the ink is also changed, and thus, in accordance with such a change, it is necessary to change the surface of the image erasing means to an optimal material. In addition, when the ink is deposited on the surface of the image erasing means to some extent, the maintenance of the image erasing means may be performed by sweeping away, scraping down or washing the ink.

Further, formula (B) is shown below in which an additional requirement is added to the above-mentioned formula (A):

$$|SP_p-SP_m|+|SP_p-SP_c|<2|SP_m-SP_c| \quad (B).$$

This formula (B) further defines the relationship between the image erasing means and the recording medium in addition to the requirement of the above-mentioned formula (A). By defining the relationship between the image erasing means and the recording medium, an adverse influence such that the image erasing means adheres to the recording medium when the ink is released can be prevented.

Specifically, a formula satisfying both of the relationship formula: $|SP_p-SP_m|<|SP_m-SP_c|$ and the relationship formula: $|SP_p-SP_c|<|SP_m-SP_c|$ is the above-mentioned formula (B), and when to $|SP_p-SP_m|<|SP_m-SP_c|$ is added $|SP_p-SP_c|<|SP_m-SP_c|$, the above-mentioned formula (B) is introduced.

As mentioned above, in the present embodiment, by defining the relationship between the SP value of the polymer of the polymer emulsion contained in the ink, the SP value of the surface layer of the recording medium, and the SP value of the surface layer of the image erasing means as shown in the above-mentioned formula (A) and formula (B), excellent fixing and release of the ink are performed; however, the substance contained in the ink is not limited to the above-mentioned polymer emulsion and may be any substance as long as it has actions to fix the ink on the recording medium and to release the ink from the recording medium.

According to the above-mentioned relationship formula in respect to the SP value, the recording and the erasing of the image are performed by means of image display device 70, and the method of recording and erasing the image is explained below.

First, with respect to the step in which an image is formed, this is carried out using the above-mentioned image writing means 1. In accordance with the image data transmitted from the host computer through the network, an image is formed by discharging an ink on display sheet 10 from image writing means 1. In this case, image writing means 1 reciprocally moves along guide shafts 22, 23 (in the main scanning direction) as mentioned above; however, the recording is performed only at the going movement and is not performed at the back movement. (Hereinafter, this is referred to as one direction recording.) It is noted that, in the present embodiment, the case of the one direction recording is described, but the present invention is not limited to this and both direction recording may be performed in which the recording is performed at both of the going movement and the back movement. Further, per one cycle of the reciprocal movement of image writing means 1 in the main scanning direction, display sheet 10 is moved by the amount corresponding to the recording width of recording head 24 in the direction represented by arrow A shown in FIG. 1 (in the sub-scanning direction) by the driving of recording medium driving part 2. The image successively written by image writing means 1 in such a way is moved in direction represented by arrow A shown in the figure, and when the recording of the desired image is terminated, display sheet 10 is moved to an appropriate position, so that the image is displayed at an appropriate display position of image display part 3. It should be noted that on the back surface of display sheet 10, supporting plate 33 is provided as shown in FIG. 2 so as to prevent the looseness of display sheet 10.

In such an image formation, since the ink of the present invention contains a polymer emulsion as mentioned above, it is possible to excellently fix the ink on the display sheet surface having a hard permeability. Further, the flowability of the ink is suppressed by the polymer emulsion, and therefore, the ink does not flow and spread on the display sheet, so that the image suffers no muddiness. Specifically, even when the adjacent dots are formed from different color inks, the dots do not interact with each other, and thus, no bleeding phenomenon (muddiness of ink) occurs at the boundary of the different colors in the image.

Figure 5:
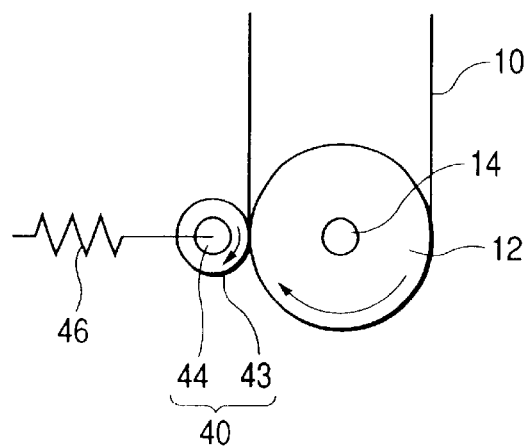
FIG. 5 is an enlarged diagrammatic view of the image erasing means used in the present invention.

Next, in the method of erasing the above-mentioned image formed, the image on display sheet 10 is erased using image erasing means 4 shown in FIG. 2 and FIG. 5. It is noted that FIG. 5 is an enlarged diagrammatic view of image erasing means 4. Image erasing means 4 comprises cleaning roller 40 capable of releasing the ink from display sheet 10 by wiping the ink on display sheet 10 and tensile spring 46.

Cleaning roller 40 has a surface formed form an elastic material, such as an acrylic material or the like, and comprises roller 43 in a cylindrical form which has substantially the same width as the display sheet width, and cleaning roller shaft 44, and is rotatably supported by the not shown frame. One end of tensile spring 46 is mounted on a part of cleaning roller shaft 44, and the other end is mounted on the not shown frame. By such a construction, cleaning roller 40 can be rotated, and the distance from display sheet 10 can also be changed. Further, cleaning roller 40 is driven by the not shown cleaning roller driving part, and rotated in the rotation direction or in the reverse rotation direction, relative to the moving direction A of the display sheet.

By pressing the above-mentioned cleaning roller 40 to the display sheet while rotating in accordance with the movement of display sheet 10, the ink on display sheet 10 is allowed to adhere to cleaning roller 40. As a result, the ink can be released from display sheet 10, so that the image can be erased. It is noted that the pressure at which cleaning roller 40 is pressed to display sheet 10 is preferably in the range of 1 to 10 $kg/cm^2$.

By the above-mentioned construction, it becomes possible to record a color image on display sheet 10 in an ink-jet recording mode in accordance with the image data transmitted from the host computer, and, if necessary, to erase the image.

FIG. 6 is a block diagram showing one example of the construction of the control system in the image display device of the present invention according to the above-mentioned construction. The image data about the character, figure and the like to be recorded is transmitted from host computer 600, and the image data is input to receiving buffer 601 of image display device 70. In addition, the data for confirming as to whether or not the image data is appropriately transferred and the data for informing the operation state of image writing means 1 of image display device 70 and the like are returned from image display device 70 to host computer 600. The data of receiving buffer 601 is transferred to memory unit 603 and temporarily recorded by RAM (Random Accesses Memory) under control of control unit 602 having a CPU. Mechanism control unit 604 drives mechanism unit 605, such as a carriage motor, a stepping motor for a sheet feed and the like, in accordance with the instructions from control unit 602. Sensor/switch control unit 606 transmits the signal from sensor/switch unit 607, which comprises various sensors and switches, to control unit 602. Display element control unit 608 controls display element unit 609 which comprises an LED and a liquid crystal display element of the display panel group and the like, in accordance with the instructions from control unit 602. Recording head control unit 610 controls recording head 24 in accordance with the instructions from control unit 602, and further, senses the temperature information indicating the state of recording head 24 and the like, thereby transmitting the information to control unit 602. Image processing unit 612 performs processing of the image data input by recording buffer 601, and forms data for the recording.

FIG. 7 is a flow chart showing the recording operation and the erasing operation of the image in an image display device of the present invention. In this flow chart, procedure is shown in which the image recorded by the immediately prior recording operation is erased, and then, an image is newly recorded. First, during the standing-bystate prior to the recording, respective nozzles 27b, 27c, 27d, 27e of recording heads 24b, 24c, 24d, 24e are capped by cap members in recovery system unit 26. In such a standing-by state, when a signal for starting the recording is entered into control unit 602 in step S1, the recovery operation, such as the ink suction, the ink wiping or the like, is performed by recovery system unit 26 for recording head 24 in step S2. Then, the cap member is removed from recording head 24 and waits at the home position until the recording head is driven. It is noted that, here, the recovery operation of the recording head is performed before the below-described image erasing operation (step S3 to step S8), but may be performed either after completion of the image erasing operation (after step S8) or simultaneously with the image erasing operation.

In subsequent step S3, a judgement is made as to whether or not the image is recorded on the display sheet. When it is judged that the image is recorded, the image should be erased, and thus, the procedure proceeds to step S4. When it is judged that the image is not recorded, the recording of the image can be started, and thus, the procedure proceeds to step S9. It is noted that, as a method for making a judgement as to whether or not the image is recorded on the display sheet, there can be mentioned a method in which the image on the display sheet is directly recognized by image recognizing means, such as a small camera or scanner and the like; however, the method is not limited to this.

In step S4, cleaning roller 40 is driven, and pressed and contacted with display sheet 10 while rotating. Subsequently, in step S5, display sheet 10 is moved. By pressing and contacting display sheet 10 and cleaning roller 40 with each other in such a way, it is possible to allow the ink on display sheet 10 to adhere to cleaning roller 40 and release the ink from display sheet 10. Then, in step S6, a judgement is made as to whether or not the image remains on the display sheet. When it is judged that the image remains, the procedure returns to step S4 and an operation for erasing the image on the display sheet is performed again. This operation is repeated until the image is completely erased.

When it is judged that the image does not remain in step 6, the procedure proceeds to step S7, and cleaning roller 40 is separated from the display sheet, followed by stop of the driving of cleaning roller 40. Subsequently, in step S8, the movement of display sheet 10 is terminated.

By the above-mentioned operations up to step S8, the image on the display sheet is erased. Therefore, in the subsequent steps from step S9, an operation for recording the image on the display sheet is performed. In step S9, recording head 24 is driven. Then, in step S10, recording head 24 is moved reciprocally in the main scanning direction in one cycle and the image is recorded by the recording width of the recording head. Subsequently, in step S11, display sheet 10 is moved in the sub-scanning direction by the amount corresponding to the recording width of the recording head.

Then, in step S12, a judgement is made as to whether or not the image recording is completed. When it is judged that the image recording is not completed, the procedure returns to step S10 and the image is recorded again. Step 10 and step 11 are repeated until the recording of the all image is completed. When it is judged that the image recording is completed, the procedure proceeds to step S13, and display sheet 10 is moved so that the recorded image is displayed at an appropriate display position of image display part 3.

When display sheet 10 is moved to an appropriate position, the movement of display sheet 10 is terminated.

As mentioned above, the image recorded on display sheet 10 is erased, and then, a new image is recorded. It is noted that in the above description, a judgement as to whether or not the image is recorded on the display sheet is made on the side of the image display device; however, a user may make a judgement as to whether or not the image is recorded on the display sheet by himself or herself. In such a case, the user may transmit the instructions for the erasing mode for erasing the image either through host computer 600 to the image display device or by means of the display and operation panel mounted on the image display device.

Further, in the above description, a judgement is made as to whether or not the image is recorded on the display sheet, and, in accordance with this judgement, a decision is made as to whether or not the image erasing operation is performed. However, it is not necessary to make such a judgement, and the image erasing operation may be performed automatically when the device is turned on, irrespective of the presence of the image on the display sheet.

In addition, on the above-mentioned flow chart, after the image erasing operation is completed, the recording head is driven to record the image; however, the recording of the image may be performed while performing the image erasing operation. By such a construction, the recording of the image can be completed for a short time.

It should be noted that host computer 600 makes a correction for the image to be displayed to the size of display sheet 10 and transmits the image signal. In this case, differing to the ordinary printer, a signal for conducting the recording from the lower portion of the image is transmitted so that the image can be observed from the front of the device, and such an image development is performed. When the recording signal is transmitted to recording head group 24, black, cyan, magenta and yellow inks are discharged from the respective recording heads. In the present embodiment, as recording head group 24, four heads which are respectively divided for the four colors are used; however, the recording head group is not limited to this, and one recording head may be used for dividing the liquid flow passages of the respective colors. Further, the head arrangement is not limited to that in the present embodiment, and the arrangement and the number of the heads for respective color inks can be appropriately selected.

Figure 8A:
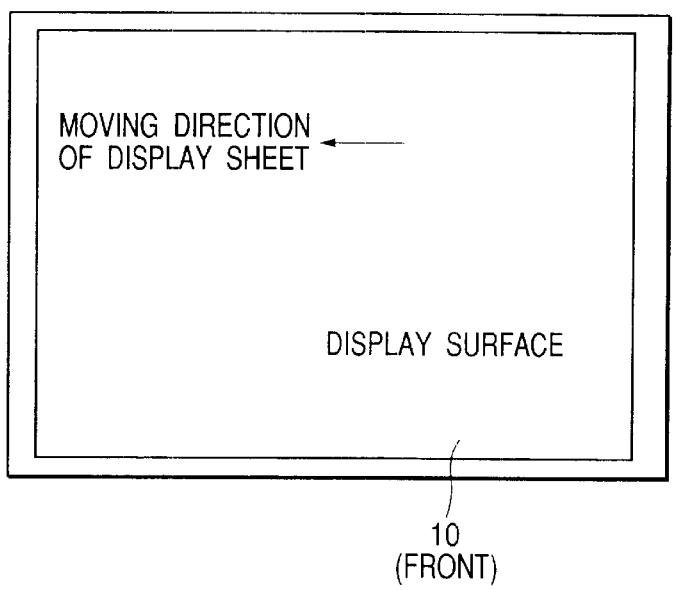
FIGS. 8A, 8B and 8C are views showing an image display device according to another embodiment of the present invention.
Figure 8B:
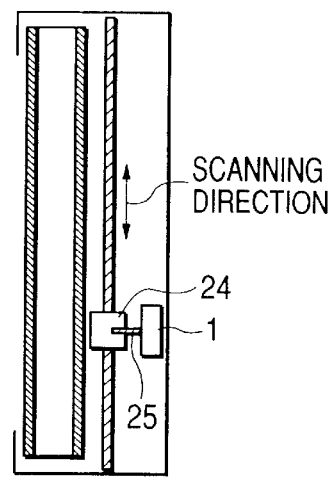
Figure 8C:
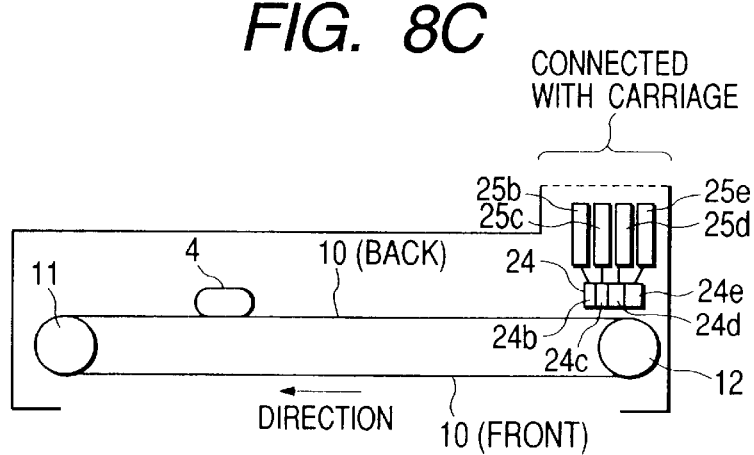

In the above description, an explanation was made on the electronic blackboard of the embodiment shown in FIG. 1, and now, an electronic blackboard of another embodiment of the present invention is described below (FIGS. 8A to 8C). FIG. 8A is a front view, FIG. 8B is a side view, and FIG. 8C is a top plain view. The embodiment shown in FIGS. 8A to 8C are examples wherein display sheet 10 is moved in the horizontal direction in the figure, and recording head 24 is scanning in the direction perpendicular to this, and the other construction is the same as that shown in FIG. 1. Also in FIGS. 8A to 8C, image erasing means (hereinafter, referred to also as cleaner) 4 is shown on the opposite side of the image display surface, and when the image formed on the display surface is not needed, the image is released and erased by this cleaner 4. Further, four types of inks of black color, cyan color, magenta color and yellow color are charged in ink tanks 25b, 25c, 25d and 25e, which are integrated as shown in FIG. 8C, and each color ink is supplied from ink tank 25 to ink-jet head 24 and the ink is discharged from head 24 on the display surface of display sheet 10 in accordance with the image signal, so that an optional color image (for example, a monocolor image of each color, a color image or full-color image of two or more colors, or the like) can be formed. The above electronic blackboard of the present invention is largely different from the liquid crystal type electronic blackboard among the conventional electronic blackboards in a point such that in the liquid crystal type, the display sheet is not moved and address is made by electric wiring, and is largely different from the magnestylus type electronic blackboard in a point such that in the magnestylus type, only the movement of the display sheet is performed.

It is preferred that the arrangement of ink-jet head 24 is, as shown in FIG. 8C, on the non-display part of the electronic blackboard and further at a site such that the maintenance can be easily performed. As mentioned below, ink-jet head 24 is scanned by a carriage in the direction perpendicular to the moving direction of the display sheet.

Figure 9:
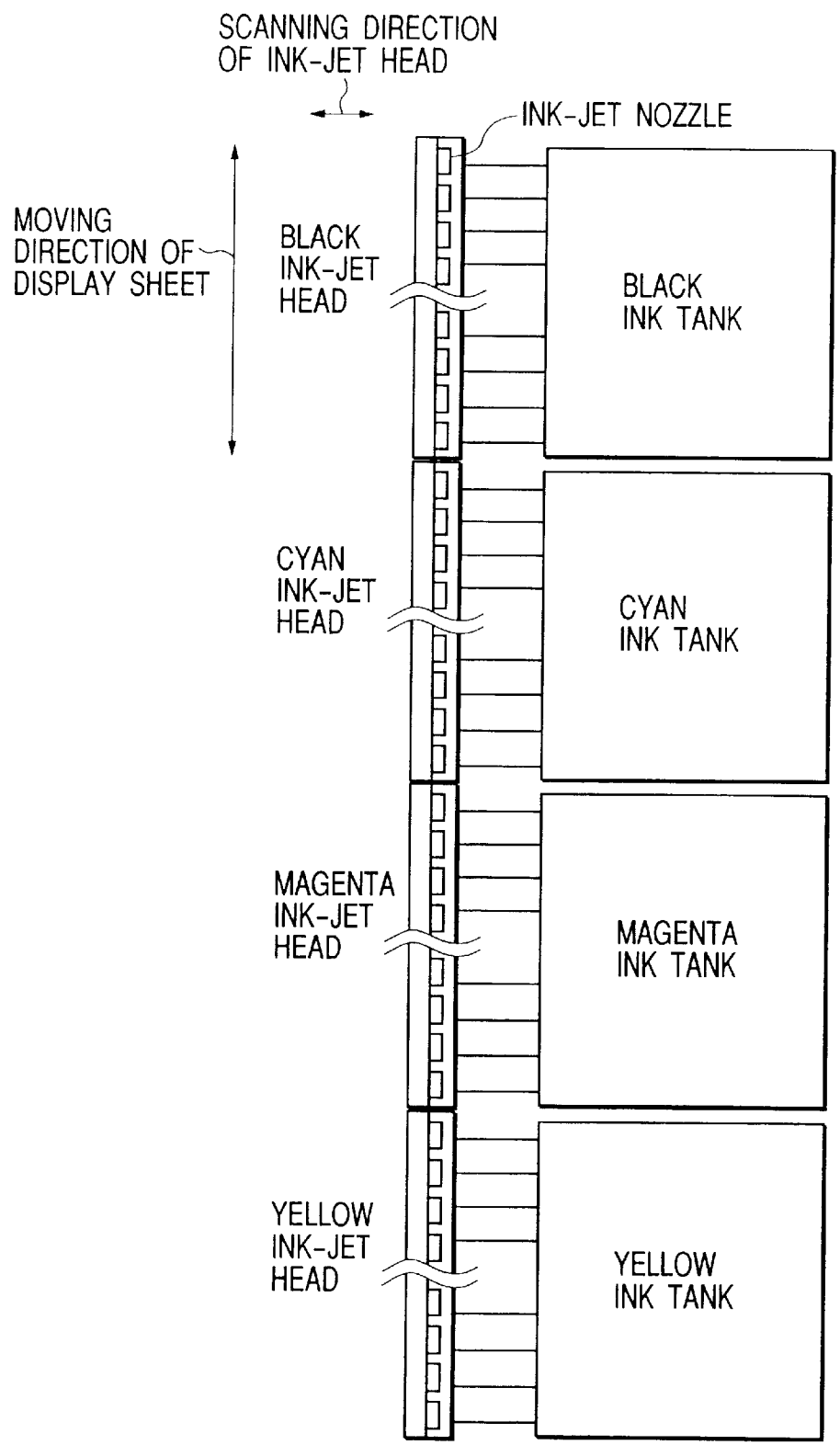
FIG. 9 is a view showing that heads for respective colors are arranged in the same direction as the moving direction of the display sheet.

In the above-mentioned device construction, it is preferred that ink-jet heads 24 for four colors (24b, 24c, 24d, 24e) are integrated as shown in FIG. 8C, and the four heads for the respective colors are arranged in the same direction as the moving direction of the display sheet as shown in FIG. 9. This relates to the drying time. Specifically, since the display sheet has a hard liquid permeability, a time is required until the ink applied on the recording medium is apparently dried. For example, when two-dimensional color (R.G.B) is formed, it is necessary that, after the initially applied ink is dried apparently, the subsequent ink be applied. Unless such procedure is conducted, there is a possibility that muddiness of ink occurs on the recording medium. Therefore, for the purpose of prolonging the time interval of the application of different color inks, the arrangement of the heads shown in FIG. 9 is preferred.

Further, in the electronic blackboard of the present invention, when the area of the image formed on the display sheet is a predetermined area or more, it is preferred that the ink dots to be applied onto the above-mentioned recording medium are preliminarily thinned out at a predetermined rate. This is because the image formed on the display sheet is considerably large, as compared to the image printed on the ordinary recording paper, and a high density required in the ordinary printer is not necessary. For example, in the formation of an image, such as a character, a line or the like, even when the number of the ink dots to be formed are reduced (thinned out), a satisfactory quality of a character and a line can be ensured. By thinning out the ink dots in this manner, the recording speed is enhanced and problems concerning the muddiness of ink can be reduced.

In the electronic blackboard of the present invention, even when the resolution of the image formed is lowered (or the gradation is lowered), it is preferred the contact between the ink drops immediately after the printing is reduced. This is because the opacifying ratio of the pigment ink is high, as compared to that of the dye ink, and therefore, a satisfactory image concentration can be obtained even when the printing density is reduced or thinned out. Further, the color reproducibility is good and the image concentration is also enhanced in the case where the printing is performed by shifting the ink drops rather than in the case where the printing is performed by superposing the ink drops.

As mentioned above, the present invention exhibits excellent effects in the recording device using the recording head, in an ink-jet recording method, especially in such an ink-jet method that flying liquid drops are formed utilizing heat energy to perform the recording.

With respect to the representative construction and principle, it is preferred to employ the basic principle disclosed in U.S. Pat. Nos. 4,723,129 and 4,740,796. This mode can be applied to either the on-demand type or the continuous type. Particularly, in the case of the on-demand type, by applying at least one driving signal for rapidly increasing the temperature to more than the boiling point in accordance with the recording information to the electrothermal transducer arranged relative to the sheet and liquid passage at which the liquid (ink) is kept, heat energy is generated in the electrothermal transducer and the film boiling is allowed to occur at the heat action surface of the recording head. As a result, bubbles can be formed in the liquid (ink) corresponding to this driving signal one by one, and thus, this is effective. By this growth and constriction of the bubbles, the liquid (ink) is discharged through the opening for discharging, to thereby form at least one drop. When this driving signal is in a pulse form, the growth and constriction of the bubbles can be appropriately performed rapidly, and particularly, the discharging of the liquid (ink) exhibiting excellent response property can be achieved, and thus, this is more preferred. As this driving signal in a pulse form, those described in U.S. Pat. Nos. 4,463,359 and 4,345,262 are suitable. It is noted that when the conditions described in U.S. Pat. No. 4,313,124, which invention is directed to the temperature rising ratio of the above-mentioned heat action surface, is employed, more excellent recording can be performed.

As the construction of the recording head, in addition to the construction of the combination (linear liquid flow passage or right angle liquid flow passage) of the discharging port, the liquid passage and the electrothermal transducer disclosed in each of the above-mentioned prior art documents, the construction disclosed in U.S. Pat. Nos. 4,558,333 and 4,459,600, which are directed to a construction such that the heat action part is arranged in a flexing region, is also included in the present invention.

In addition, the construction disclosed in Japanese Patent Application Laid-Open No. 59-123670, in which the slit common to a plurality of electrothermal transducers is used as a discharging part for the electrothermal transducers, and the construction disclosed in Japanese Patent Application Laid-Open No. 59-138461, in which an opening for absorbing the pressure wave of heat energy is used as a discharging part, can be effectively employed as the construction of the present invention. That is, any form of the recording head can be used in the present invention for surely and efficiently performing the recording.

Further, the present invention can be effectively applied to the full-line type recording head having a length corresponding to the maximum width of the recording medium on which the recording can be performed by the recording device. As such a recording head, either of the recording head having a construction such that the length is satisfied by the combination of a plurality of recording heads or the recording head having a construction of one recording head integrally formed may be used.

In addition, among the above-mentioned serial type, when the recording head fixed on the device body is used, the exchangeable chip type recording head which can be electrically connected with the device body by fitting on the device body and can supply the ink from the device body is used, or the cartridge type recording head in which an ink tank is integrally provided on the recording head itself is used, the present invention is also effective.

Further, as the construction of the recording device of the present invention, it is preferred that discharging recovery means of the recording head, auxiliary means and the like are added since the effects of the present invention can be further stabilized. Specific examples of such means include capping means for the recording head, cleaning means, pressurizing or suction means, an electrothermal transducer or other heating elements or preheating means using these in combination, and preliminary discharging means for discharging for the purpose other than the recording.

Further, with respect to the type and the number of the recording head to be mounted, two or more of recording heads may be mounted according to a plurality of inks which are different in the recording color and concentration. Specifically, for example, as the recording mode of the recording device, not only may the recording mode for the major colors, such as black color and the like, be used, but also the recording mode in which the recording head is integrally constructed or a plurality of recording heads are used in combination may be used, but the present invention is also extremely effective in the device which comprises at least one recording mode of the plural color for different colors or full-color for mixed color.

According to the above-mentioned embodiment, by using the pigment emulsion ink having an adhesion, the recording medium having a hard permeability, and the image erasing means, and by satisfying the above formula (A) by the SP values of these three substances, it becomes possible to fix the ink on the recording medium having a hard permeability and release the ink from the recording medium.

EXAMPLES

Hereinbelow, specific constructions, combinations and effects of the ink, the recording medium and the image erasing means will be described in more detail with reference to the following Examples.

Example 1

In this example, with respect to all of yellow, magenta, cyan and black pigment emulsion inks, an ink composition was such that an aqueous solution contains 5% by weight of a pigment, 0.1% by weight of a polybutyl acrylate emulsion and 5% by weight of propylene glycol.

As a display sheet for displaying an image, a display sheet for white board, in which a PET film is coated with fluorine, was used. It is noted that this display sheet has a water permeability of 20 (g/cm$^2$, 24 hr).

As image erasing means, a cleaning roller having a surface treated with a 1:1 copolymer of polyethyl methacrylate and polybutyl methacrylate was used.

The SP value ($SP_p$) of the polymer in the polybutyl acrylate emulsion used in this example is 9.0, the SP value ($SP_m$) of the surface layer of the display sheet used is 7.0, and the SP value ($SP_c$) of the surface layer of the image erasing means used is 9.4.

This example in which the above-mentioned ink, display sheet and image erasing means are used satisfies the relationship represented by formula (A):

$$|SP_p-SP_m|>|SP_p-SP_c| \qquad (A).$$

In this example, all of the pigment emulsion inks was excellently fixed on the display sheet, and a clear color image free from muddiness was obtained. Further, when the image erasing was performed, the cleaning roller was contacted with the ink, so that the ink on the display sheet could be surely released.

Example 2

In this example, the same inks as those used in Example 1 except that, instead of the polymer emulsion, "0.2% by weight" of "NX148, manufactured/sold by Mitsubishi Rayon Co., Ltd. (solids content: 45.2% by weight) having a glass transition temperature of −49° C." was used.

In addition, as a display sheet, a PET film (Lumirror, manufactured/sold by Toray Industries Inc.) was used.

Further, as image erasing means, a cleaning roller having a surface treated with polypropyl acrylate was used.

The SP value ($SP_p$) of the polymer in the polymer emulsion used in this example is 8.8, the SP value ($SP_m$) of the surface layer of the display sheet used is 10.7, and the SP value ($SP_c$) of the surface layer of the image erasing means used is 9.0.

This example in which the above-mentioned ink, display sheet and image erasing means are used satisfies the relationship represented by following (B):

$$|SP_p-SP_m|+|SP_p-SP_c|<2|SP_m-SP_c| \quad (B).$$

Also in this example, the same excellent results as those in Example 1 were obtained.

Comparative Example 1

The same inks as those used in Example 1 were used, and as a display sheet, an acryl-coated PET film (trade name: Rapiro, manufactured/sold by KIMOTO Co., Ltd.) was used, and as image erasing means, a fluorine-coated cleaning roller was used.

The SP value ($SP_p$) of the polymer in the polybutyl methacrylate emulsion used in Comparative Example 1 is 9.0, the SP value ($SP_m$) of the surface layer of the display sheet used is 8.4, and the SP value ($SP_c$) of the surface layer of the image erasing means used is 7.8.

The comparative example in which the above-mentioned ink, display sheet and image erasing means are used satisfies neither the relationship of the above-mentioned formula (A) nor that of the above-mentioned formula (B).

In this Comparative Example 1, when the erasing of an image was performed, almost no ink adhered to the cleaning roller and the ink could not be released from the display sheet. When the above-mentioned formulae (A) and (B) are not satisfied, excellent image erasing cannot be performed.

Example 3

A color ink for electronic blackboard was prepared as follows.
[Black Ink]
(Preparation of Pigment Dispersion)

Styrene-acrylic acid-butyl acrylate copolymer (acid value: 116, weight average molecular weight: 3,700) 1.5% by weight Monoethanolamine 1.0% by weight Ion-exchanged water 81.5% by weight Diethylene glycol 5.0% by weight The above-mentioned ingredients were mixed together and heated by a water bath to 70° C., so that the resin component was completely dissolved. To this solution were added 10.0% by weight of carbon black (MCF88, manufactured/sold by Mitsubishi Chemical Corporation) which was newly made experimental basis and 1.0% by weight of isopropyl alcohol, followed by pre-mixing for 30 min. Then, a dispersion treatment was conducted under the following conditions.

Dispersing machine: Sand grinder (manufactured/sold by Igarashi Kikai)

Grinding media: Zirconium beads, 1 mm diameter

Packing ratio of grinding media: 50% by volume p1
Grinding time: 3 hrs

Further, a centrifugal treatment (12,000 rpm, for 20 min) was conducted to remove coarse particles, to thereby form a dispersion.
(Preparation of Ink)

The above-mentioned dispersion 10.0% by weight

Teisan resin 370N (Emulsion having a Polymer Content of 50%) 0.2% by Weight

Propylene glycol 5.0% by weight

Isopropyl alcohol 10.0% by weight

Ion-exchanged water 74.8% by weight

The above-mentioned ingredients were mixed together, followed by adjustment using monoethanolamine so that the pH became in the range of 8 to 10, to thereby prepare a black ink.

The proportion of the components of the above-mentioned black ink is as follows.

Pigment 1.0%

Polymer emulsion 0.1%

Glycol (Propylene glycol) 5.5%

Alcohol (Isopropyl alcohol) 10.0%

The same proportion as this proportion is used in the below-described color inks. It is noted that Teisan resin 370N was an acrylic polymer emulsion and had a glass transition temperature of −32° C.
[Yellow Ink]

A yellow ink was obtained in the same recipe as in the above black ink except that the carbon black as a pigment was changed to C. I. Pigment Yellow 13.
[Magenta Ink]

A magenta ink was obtained in the same recipe as in the above black ink except that the carbon black as a pigment was changed to C. I. Pigment Red 7.
[Cyan Ink]

A cyan ink was obtained in the same recipe as in the above black ink except that the carbon black as a pigment was changed to C. I. Pigment Blue 22.

The inks prepared in this Example 3 could be excellently discharged from an ink-jet head. In addition, there was no occurrence of a non-discharge nozzle.

According to Example 3, there can be provided a color ink for electronic blackboard, having excellence in the ink discharge stability, the long-term dispersion stability, and, additionally, the prevention property for setting of the ink at a fine nozzle tip due to the long-term standing, and the like.

Example 4

The four colors of color inks for electronic blackboard prepared in Example 3 were discharged from an ink-jet head in the order of black, cyan, magenta and yellow, to thereby obtain a color image on the display sheet. It is noted that as a display sheet, a sheet in the form of an endless belt composed of an acryl hard-coated polyethylene terephthalate film was used, and the display sheet was moved by applying a tension to rotate two rollers while supporting the sheet by the two rollers In the long-length electronic blackboard shown in FIG. 1, as designed values, the width of the display sheet was 1,000 mm, the horizontal width of the display part was 800 mm, and the length of the display part was 1,000 mm, and the display sheet was continuously moved at a stop time of the display sheet of 10 sec and at a moving speed of the display sheet of 100 msec/line=200 mm/sec. One side of the ink-jet head nozzle was 50 μm the diameter of the dot immediately after printing was about 80 μm, the nozzle pitch was 200 m, the number of nozzles per head was 80, the pitch (pitch of a line) of the ink-jet head for each color was 200 mm in interval, and the scanning speed of the ink-jet head was set at 100 mm/sec, and the printing was conducted by the reciprocation of the scanning head during the stop of the above-mentioned sheet. A time required for the printing of the entire display part was about 8 min.

Each color ink was substantially fixed on the display sheet for about 10 sec until the subsequent color ink was superposed. Further, according this Example 4, an excellent color image free from muddiness can be obtained.

Example 5

The image formed in Example 4 was erased by means of the cleaner provided on the electronic blackboard shown in FIG. 1. The ink on the display sheet was completely released, and it was possible to perform excellent image erasing. Further, when an image was formed on the display sheet again, an excellent color image could be obtained. Therefore, by using the ink in Example 3 and the electronic blackboard in FIG. 1, there can be provided an electronic blackboard in which it is possible to record an image on the display sheet repeatedly and to erase the image repeatedly.

Example 6

The four color inks of the present invention were prepared in the same manner as in Example 3 except that, instead of the polymer emulsion in Example 3, 0.2% by weight of "NX-148 (manufactured/sold by Mitsubishi Rayon Co., Ltd., Tg=−49° C.)" having a solids content of 45.2% by weight was used, and a color image was formed on the display sheet, the image was erased, and further, an image was formed again, in the same manner as in Example 4 and Example 5. The same excellent results as those in Examples 3 to 5 were obtained.

Example 7

The four color inks of the present invention were prepared in the same manner as in Example 3 except that, instead of the polymer emulsion in Example 3, 0.2% by weight of "K Dine E-03H (manufactured/sold by Soken Chemical & Engineering Co., Ltd., Tg=−69° C.)" having a solids content of 60 to 63% by weight was used, and a color image was formed on the display sheet, the image was erased, and further, an image was formed again, in the same manner as in Example 4 and Example 5. The same excellent results as those in Examples 3 to 5 were obtained.

Comparative Example 2

The four color inks in Comparative Example 2 were prepared in the same manner as in Example 3 except that the polymer emulsion in Example 3 was not used, and a color image was formed on the display sheet, the image was erased, and further, an image was formed again, in the same manner as in Example 4 and Example 5. As a result, the image flowed, and an image deterioration, such as lowering of resolution or the like, was observed. In addition, the release of the ink was not complete, and thus, excellent image erasing could not be achieved.

As explained above, according to the present invention, by using the ink containing a polymer dispersion in which a polymer is dispersed in a liquid, the recording medium and the image erasing means, it becomes possible to fix the ink on the recording medium and to release the ink from the recording medium.

In addition, according to the present invention, it becomes possible to provide an image display device which can display high quality color image made of ink.

Further, according to the present invention, it becomes possible to provide an image display device which can successively display the information for a static image for the purpose of advertisement, propaganda, notice and the like from an external image display device, such as a computer or the like, through a network from a distant place, and in a plurality of places simultaneously.

The present invention is not limited to the above embodiments and various changes and modifications can be mode within the spirit and scope of the present invention. Therefore, to apprise the public of the scope of the present invention the following claims are made.

What is claimed is:

1. An image display apparatus for displaying an image on a recording medium using an ink, comprising:

ink application means for applying an ink onto said recording medium in accordance with image data; and image erasing means for erasing the image by coming in contact with the image formed on said recording medium by said ink application means and then separating from said recording medium, wherein, when the solubility parameter (SP value) of the substance remaining on said recording medium after applying the ink is taken as $SP_p$, the SP value of the substance constituting the surface of said recording medium is taken as $SP_m$, and the SP value of the substance constituting the surface of said image erasing medium is taken as $SP_c$, $SP_p$, $SP_m$ and $SP_c$ satisfy the relationship: $|SP_p-SP_m|>|SP_p-SP_c|$.

2. The image display apparatus according to claim 1, wherein $SP_p$, $SP_m$ and $SP_c$ satisfy the relationship: $|SP_p-SP_m|+|SP_p-SP_c|<2|SP_m-SP_c|$.

3. The image display apparatus according to claim 1, wherein said recording medium is a recording medium through which the ink does not substantially permeate.

4. The image display apparatus according to claim 1, wherein the ink is an ink in which a polymer is dispersed.

5. The image display apparatus according to claim 4, wherein the polymer is polyvinyl acetate or an acrylic polymer.

6. The image display apparatus according to claim 4, wherein the polymer has a glass transition temperature of 0° C. or less.

7. The image display apparatus according to claim 4, wherein the polymer has a molecular weight of 1,000 or more.

8. The image display apparatus according to claim 1, wherein the substance remaining on said recording medium is a polymer.

9. The image display apparatus according to claim 1, wherein the ink comprises at least one selected from the group consisting of (i) a glycol and an alcohol, (ii) an emulsion in which a polymer is dispersed in a liquid, and (iii) a pigment, and wherein the ink contains 0 to 10% by weight of the glycol, 0 to 20% by weight of the alcohol, 0.001 to 0.5% by weight of the emulsion, and 1 to 10% by weight of the pigment, based on the total weight of the ink.

10. The image display apparatus according to claim 9, wherein the color of the pigment is at least one selected from the group consisting of black, yellow, magenta and cyan.

11. The image display apparatus according to claim 9, wherein the glycol is an alkylene glycol containing an alkylene group having 2 to 6 carbon atoms.

12. The image display apparatus according to claim 9, wherein the alcohol is an alkyl alcohol having 1 to 4 carbon atoms.

13. The image display apparatus according to claim 1, wherein said image erasing means erases the image by pressing to said recording medium at a predetermined pressure and then separating from said recording medium.

14. The image display apparatus according to claim 13, wherein the pressure at which said image erasing means is pressed to said recording medium is 1 to 10 kg/cm$^2$.

15. The image display apparatus according to claim 1, wherein said image erasing means is an adhesive roller having a surface of an acrylic polymer.

16. The image display apparatus according to claim 1, wherein said ink application means is an ink-jet recording head for discharging an ink to perform the recording.

17. The image display apparatus according to claim 16, wherein said ink-jet recording head comprises a head for discharging a yellow ink, a head for discharging a magenta ink, a head for discharging a cyan ink, and a head for discharging a black ink, wherein said heads are arranged in the same direction as the moving direction of said recording medium.

18. The image display apparatus according to claim 16, wherein said ink-jet recording head comprises heat energy generation means for applying heat to an ink to generate bubbles and discharging the ink in accordance with the generation of the bubbles.

19. The image display apparatus according to claim 1, wherein, when the area of the image formed on said recording medium is a predetermined area or more, said ink application means thins out ink dots to be applied onto said recording medium.

20. A method for erasing an image, comprising the steps of:

applying an ink onto a recording medium to form an image; and contacting a substance for erasing an image with the image formed, and subsequently separating the substance for erasing an image from the recording medium, to thereby erase the image on the recording medium, wherein, when the solubility parameter (SP value) of the substance remaining on the recording medium after applying the ink is taken as $SP_p$, the SP value of the substance constituting the surface of the recording medium is taken as $SP_m$, and the SP value of the substance for erasing an image is taken as $SP_c$, $SP_p$, $SP_m$ and $SP_c$ satisfy the relationship: $|SP_p-SP_m|>|SP_p-SP_c|$.

21. The image erasing method according to claim 20, wherein $SP_p$, $SP_m$ and $SP_c$ satisfy the relationship: $|SP_p-SP_m|+|SP_p-SP_c|>2|SP_m-SP_c|$.

22. The image erasing method according to claim 20, wherein the recording medium is a recording medium through which the ink does not substantially permeate.

23. The image erasing method according to claim 20, wherein the ink is an ink in which a polymer is dispersed in a liquid.

24. The image erasing method according to claim 23, wherein the polymer is polyvinyl acetate or an acrylic polymer.

25. The image erasing method according to claim 23, wherein the polymer has a glass transition temperature of 0° C. or less.

26. The image erasing method according to claim 23, wherein the polymer has a molecular weight of 1,000 or more.

27. The image erasing method according to claim 20, wherein the substance remaining on the recording medium is a polymer.

28. The image erasing method according to claim 20, wherein the ink comprises at least one selected from the group consisting of (i) a glycol and an alcohol, (ii) an emulsion in which a polymer is dispersed in a liquid, and (iii) a pigment, and wherein the ink contains 0 to 10% by weight of the glycol, 0 to 20% by weight of the alcohol, 0.001 to 0.5% by weight of the emulsion, and 1 to 10% by weight of the pigment, based on the total weight of the ink.

29. The image erasing method according to claim 28, wherein the color of the pigment is at least one selected from the group consisting of black, yellow, magenta and cyan.

30. The image erasing method according to claim 28, wherein the glycol is an alkylene glycol containing an alkylene group having 2 to 6 carbon atoms.

31. The image erasing method according to claim 28, wherein the alcohol is an alkyl alcohol having 1 to 4 carbon atoms.

32. The image erasing method according to claim 20, wherein the substance for erasing an image erases the image by pressing to the recording medium at a predetermined pressure and then separating from the recording medium.

33. The image erasing method according to claim 32, wherein the pressure at which the substance for erasing an image is pressed to the recording medium is 1 to 10 kg/cm$^2$.

34. The image erasing method according to claim 20, wherein the substance for erasing an image is an acrylic polymer.

35. An image display apparatus comprising:

an ink-jet head capable of discharging an ink in which a polymer is dispersed;

a recording medium having a hard permeability for the ink, for displaying an image made from the ink; and ink release means capable of releasing the ink from said recording medium by coming in contact with the ink on said recording medium and then separating from said recording medium, wherein the substance constituting the surface of said ink release means is selected so that the attractive force exhibited between the ink and the surface of said ink release means is stronger than that exhibited between the ink and said recording medium.

* * * * *

UNITED STATES PATENT AND TRADEMARK OFFICE
CERTIFICATE OF CORRECTION

PATENT NO. : 6,379,001 B1
DATED : April 30, 2002
INVENTOR(S) : Tomida et al.

It is certified that error appears in the above-identified patent and that said Letters Patent is hereby corrected as shown below:

Column 1,
Line 23, "almost" should read -- mostly --.

Column 3,
Line 10, "of the" should be deleted; and
Line 39, "visibleness" should read -- visibility --.

Column 4,
Line 5, "632095," should read -- 6-32095, --.

Column 5,
Line 25, "opalescence" should read -- opalescent --.

Column 10,
Line 24, "of" should be deleted.

Column 12,
Line 15, "NFA37ON" should read -- NFA370N --.

Column 13,
Line 48, "Colo.)," should read -- Co.), --.

Column 16,
Line 15, "water-soluble" should read -- water-soluble resin --.

Column 18,
Line 19, "largely" should read -- much --.

Column 20,
Line 7, "$SP_c$" should read -- $SP_c|$ --.

Column 22,
Line 2, "standing-bystate" should read -- standing-by state --.

Column 23,
Line 31, "to" should read -- from --.

Column 26,
Line 58, "was" should read -- were --.

Column 27,
Line 3, "was" should read -- were --.

UNITED STATES PATENT AND TRADEMARK OFFICE
CERTIFICATE OF CORRECTION

PATENT NO. : 6,379,001 B1
DATED : April 30, 2002
INVENTOR(S) : Tomida et al.

It is certified that error appears in the above-identified patent and that said Letters Patent is hereby corrected as shown below:

Column 28,
Line 63, "designed" should read -- designated --.

Column 29,
Line 2, "50$\mu$m" should read -- 50$\mu$m, --.

Column 30,
Line 15, "mode" should read -- made --.

Column 31,
Line 56, "$SP_m|+|SP_p-SP_c|>2|SP_m-SP_c|$ ." should read -- $SP_m|+|SP_p-SP_c|<2|SP_m-SP_c|$. --.

Signed and Sealed this

Twenty-eighth Day of January, 2003

JAMES E. ROGAN
*Director of the United States Patent and Trademark Office*